(12) United States Patent
Adeyemi et al.

(10) Patent No.: US 11,680,829 B2
(45) Date of Patent: *Jun. 20, 2023

(54) METHOD AND SYSTEM FOR DETECTING EVENTS IN A CONDUIT

(71) Applicant: HIFI ENGINEERING INC., Calgary (CA)

(72) Inventors: Adekunle Adeyemi, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,671

(22) Filed: Jul. 20, 2022

(65) Prior Publication Data
US 2022/0364888 A1 Nov. 17, 2022

Related U.S. Application Data

(63) Continuation of application No. 16/961,031, filed as application No. PCT/CA2019/050025 on Jan. 8, 2019, now Pat. No. 11,441,926.
(Continued)

(51) Int. Cl.
*G01D 5/30* (2006.01)
*G01D 5/353* (2006.01)
(Continued)

(52) U.S. Cl.
CPC ......... *G01D 5/35361* (2013.01); *G01H 9/004* (2013.01); *G01K 11/3206* (2013.01); *G01L 1/246* (2013.01)

(58) Field of Classification Search
None
See application file for complete search history.

(56) References Cited

U.S. PATENT DOCUMENTS

| 2012/0230629 A1* | 9/2012 | Hill | G01D 5/35348 |
| | | | 385/12 |
| 2016/0252463 A1* | 9/2016 | Uno | G01L 1/24 |
| | | | 250/227.14 |

FOREIGN PATENT DOCUMENTS

| CA | 301606046 A1 | 9/2017 |
| WO | 2013102252 A1 | 7/2013 |

OTHER PUBLICATIONS

International Search Report and Written Opinion of PCT/CA2019/050025 dated Mar. 28, 2019.

* cited by examiner

*Primary Examiner* — Brandi N Hopkins
*Assistant Examiner* — Nigel H Plumb
(74) *Attorney, Agent, or Firm* — D'Ambrosio & Menon, PLLC; Usha Menon

(57) ABSTRACT

There is provided a system for determining multiple baselines for detecting events in a conduit. The system comprises an optical fiber interrogator for interrogating optical fiber; and one or more processors communicative with the optical fiber interrogator and memory having stored thereon computer program code configured, when executed by the one or more processors, to cause the one or more processors to perform a method. The method comprises, for each of multiple channels of the conduit, each channel comprising a portion of the conduit: obtaining phase data for the channel, the phase data being obtained by causing the optical fiber interrogator to interrogate optical fiber positioned alongside the conduit; and determining one or more baselines from the phase data. As a result, events in the conduit may be detected with fewer false positives.

18 Claims, 24 Drawing Sheets

Related U.S. Application Data

(60) Provisional application No. 62/615,871, filed on Jan. 10, 2018.

(51) Int. Cl.
 *G01H 9/00* (2006.01)
 *G01K 11/3206* (2021.01)
 *G01L 1/24* (2006.01)

| | No-Flow RMS Baseline | | | | |
|---|---|---|---|---|---|
| Channels 2-7 | 0.0059 | 0.0059 | 0.0055 | 0.0065 | 0.0059 | 0.0067 |
| Channels 8-13 | 0.0089 | 0.0105 | 0.0051 | 0.0060 | 0.0069 | 0.0076 |
| Channels 14-19 | 0.0093 | 0.0071 | 0.0071 | 0.0094 | 0.0061 | 0.0073 |
| Channels 20-25 | 0.0071 | 0.0112 | 0.0231 | 0.0080 | 0.0064 | 0.0085 |
| Channels 26-31 | 0.0053 | 0.0056 | 0.0069 | 0.0067 | 0.0068 | 0.0068 |
| Channels 32-37 | 0.0061 | 0.0079 | 0.0061 | 0.0056 | 0.0061 | 0.0058 |
| | Flow RMS Baseline | | | | |
| Channels 2-7 | 0.0133 | 0.0110 | 0.0105 | 0.0092 | 0.0086 | 0.0089 |
| Channels 8-13 | 0.0099 | 0.0122 | 0.0079 | 0.0075 | 0.0077 | 0.0086 |
| Channels 14-19 | 0.0101 | 0.0089 | 0.0075 | 0.0132 | 0.0061 | 0.0066 |
| Channels 20-25 | 0.0064 | 0.0103 | 0.0313 | 0.0095 | 0.0073 | 0.0088 |
| Channels 26-31 | 0.0070 | 0.0069 | 0.0077 | 0.0074 | 0.0066 | 0.0067 |
| Channels 32-37 | 0.0066 | 0.0095 | 0.0064 | 0.0057 | 0.0066 | 0.0059 |

FIG. 12

METHOD AND SYSTEM FOR DETECTING EVENTS IN A CONDUIT

CROSS REFERENCE TO RELATED APPLICATION

This application is a continuation of and claims priority to U.S. Ser. No. 16/961,031 filed on Jul. 9, 2020, which is a U.S. National Stage entry of PCT/CA2019/050025 filed Jan. 8, 2019, which claims priority to U.S. provisional application Ser. No. 62/615,871 filed Jan. 10, 2018, entitled "Method and System for Detecting Events in a Conduit," the contents of which are incorporated herein by reference in its entirety.

FIELD OF THE DISCLOSURE

The present disclosure relates to methods and systems for detecting events in a conduit, such as a pipeline.

BACKGROUND TO THE DISCLOSURE

Fiber optic cables are often used for distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Fiber optic monitoring of pipelines is a very data-intensive task. On a daily basis, terabytes of data can easily be generated from a given segment of pipeline. For example, a 2 km pipeline being monitored using fiber optic cables with a spatial resolution of 25 m, with data being acquired at a rate of 40 kHz, can generate 1 terabyte of data per day.

In addition to the sheer volume of data, another challenge in monitoring pipelines is event detection with reduced likelihood of false positives. One common problem is that different sections of the pipeline experience different ambient conditions. For example, one section may be near a road where vehicular traffic generates an elevated background acoustic level, while another section may located far from active acoustic sources.

The present disclosure seeks to address at least some of the problems in the prior art, by providing improved methods and systems for event detection in a conduit.

SUMMARY OF THE DISCLOSURE

In a first aspect of the disclosure, there is provided a method of determining multiple baselines for detecting events in a conduit, the method comprising: for each of multiple channels of the conduit, each channel comprising a portion of the conduit: obtaining sensor data for the channel, the sensor data being obtained from one or more sensors positioned to obtain sensor readings from the channel; and determining one or more baselines from the sensor data.

Thus, if a particular sensing parameter (e.g. acoustics, strain, machine frequencies, etc.) is higher in one channel than another channel, then using a single baseline for both channels may result in frequent triggering of events on the channel with the higher sensing parameter, which would be undesirable, increasing the likelihood of false positives. Conversely, if a universal baseline applied to the whole conduit were too high (so as to avoid false positives), "smaller" events (with relatively lower sensing parameters) may be missed. Thus, with the above aspect of the disclosure, a separate baseline for each individual portion of the conduit may be determined, thereby reducing the incidence of false positives while ensuring that smaller events are less likely to be missed.

Obtaining the sensor data may comprise using the one or more sensors to obtain the sensor readings.

The sensor data may comprises sensor data obtained when a fluid is flowing through the conduit or when no fluid is flowing through the conduit.

Obtaining the sensor data may comprise interrogating optical fiber positioned alongside the conduit. The sensor data may comprise phase data obtained by measuring interference between light pulses transmitted along the optical fiber.

The one or more sensors may comprise one or more of pressure sensors, acoustic sensors, strain sensors, and temperature sensors.

Each baseline may be representative of steady state sensor data for the channel.

Determining the one or more baselines may comprise: extracting parameter data from the sensor data; and determining the one or more baselines from the extracted parameter data. The parameter data may comprise data relating to one or more parameters from a group comprising: temperature, strain, acoustics, and vibration. Determining the one or more baselines may further comprise: processing the extracted parameter data to determine one or more statistical parameters of the parameter data; and determining the one or more baselines from the one or more statistical parameters. The one or more statistical parameters may comprise one or more of: a mean of the parameter data; a median of the parameter data; a standard deviation of the parameter data; and a variance of the parameter data.

The one or more baselines may comprise a mean of the parameter data, and a standard deviation of the parameter data.

The method may further comprise, for each of the multiple channels, setting one or more event thresholds for identifying when an event has occurred at the channel. The method may further comprise, for each of the multiple channels: measuring sensor data by using the one or more sensors to obtain sensor readings from the channel; and identifying whether an event has occurred at the channel using the measured sensor data and the one or more event thresholds. Identifying whether an event has occurred may comprise: extracting parameter data from the measured sensor data; and determining whether a magnitude of at least one parameter of the extracted parameter data has exceeded at least one of the one or more event thresholds.

An event may be determined to have occurred if (parameter value−mean)/(M*std)×1, wherein parameter value is a value of the parameter data, mean is a mean of the parameter data, M is a user-selectable parameter greater than 0, and std is a standard deviation of the parameter data. In some embodiments, an event may be determined to have occurred if multiple parameters exceed their respective event thresholds. For example, an event may be determined to have occurred only if both strain and acoustics are determined to have exceeded their event thresholds. In other words, an event may be determined to have occurred if $((\text{parameter value})_{i\ldots N} - \text{mean}_{i\ldots N})/(M_{i\ldots N} * \text{std}_{i\ldots N}) > 1$, wherein (parameter value)$_{i\ldots N}$ is a value of the $i^{th}$ parameter data, mean$_{i\ldots N}$ is a mean of the $i^{th}$ parameter data, M is a scalar greater than 0, std$_{i\ldots N}$ is a standard deviation of the $i^{th}$ parameter data, and N is an integer greater than 1. In particular, an event may be determined to have occurred only if all required parameters exceed their respective event thresholds simultaneously. For instance, using the above, example, an event may be determined to have occurred only if both strain and acoustics are determined to have exceeded their event thresholds simultaneously.

The method may further comprise: processing the sensor data so as to identify undesired noise; and removing the undesired noise from the sensor data. The conduit may comprise a pipeline or a well.

The baseline for each channel may be affected by the channel's physical placement and proximity to acoustic, vibration, strain and temperature sources, as well as the seasons (e.g. winter conditions around the channel may be different from summer conditions), and the mode of operation of the conduit (in active flowing mode, slack mode, etc). Thus, multiple sets of baselines may be determined, with each set being dependent on one or more conditions affecting the conduit.

In a further aspect of the disclosure, there is provided a system for determining multiple baselines for detecting events in a conduit, comprising: an optical fiber interrogator for interrogating optical fiber; and one or more processors communicative with the optical fiber interrogator and memory having stored thereon computer program code configured, when executed by the one or more processors, to cause the one or more processors to perform a method comprising: for each of multiple channels of the conduit, each channel comprising a portion of the conduit: obtaining phase data for the channel, the phase data being obtained by causing the optical fiber interrogator to interrogate optical fiber positioned alongside the conduit; and determining one or more baselines from the phase data.

The system may further comprise: the conduit; and the optical fiber positioned alongside the conduit. The interrogator may be optically coupled to the optical fiber and configured to interrogate the optical fiber by: transmitting pulses along the optical fiber; receiving reflections of the pulses; and measuring interference from the reflections.

The method implemented by the system may comprise any of the steps or operations described above in connection with the first aspect of the disclosure.

In a further aspect of the disclosure, there is provided a computer-readable medium having stored thereon computer program code executable by the one or more processors and configured, when executed by the one or more processors, to cause the one or more processors to perform a method comprising: for each of multiple channels of a conduit, each channel comprising a portion of the conduit: obtaining sensor data for the channel, the sensor data being obtained from one or more sensors positioned to obtain sensor readings from the channel; and determining one or more baselines from the sensor data.

The method may comprise any of the steps or operations described above in connection with the first aspect of the disclosure.

BRIEF DESCRIPTION OF THE DRAWINGS

Embodiments of the disclosure will now be described in detail, in conjunction with the accompanying drawings of which:

FIG. 12 is a table showing baseline magnitudes as a function of channel in a pipeline;

DETAILED DESCRIPTION OF EMBODIMENTS

The present disclosure seeks to provide methods and systems for detecting events in a conduit. While various embodiments of the disclosure are described below, the disclosure is not limited to these embodiments, and variations of these embodiments may well fall within the scope of the disclosure which is to be limited only by the appended claims.

As used herein, a reference to "about" or "approximately" a number or to being "substantially" equal to a number means being within +/−10% of that number.

Generally, the present disclosure relates to methods for detecting events in a conduit such as a pipeline, by determining multiple baselines for the conduit. Multiple independent baselines may be automatically generated for multiple channels (i.e. sections) of the pipeline. Data acquired from the pipeline may be automatically processed and a representative baseline for each channel may be identified over a training period (e.g. 2 weeks). Event thresholds may be determined in terms of the mean (or median) of the acquired data, and a number of standard deviations from the mean/median.

According to the present disclosure, a pipeline may be monitored without any advance knowledge of the particular ambient conditions of each channel. In a relatively short period of time (for example, from 2 hours up to 2 weeks) and with minimal need for human intervention, thresholds for anomalies/events may be defined for each channel. Once this auto-baselining and anomaly identification step is completed, events such as leaks or third part intrusion may be flagged with a reduced likelihood of false positives, since each channel is associated with its one individual baseline (or baselines).

Figure 1A:
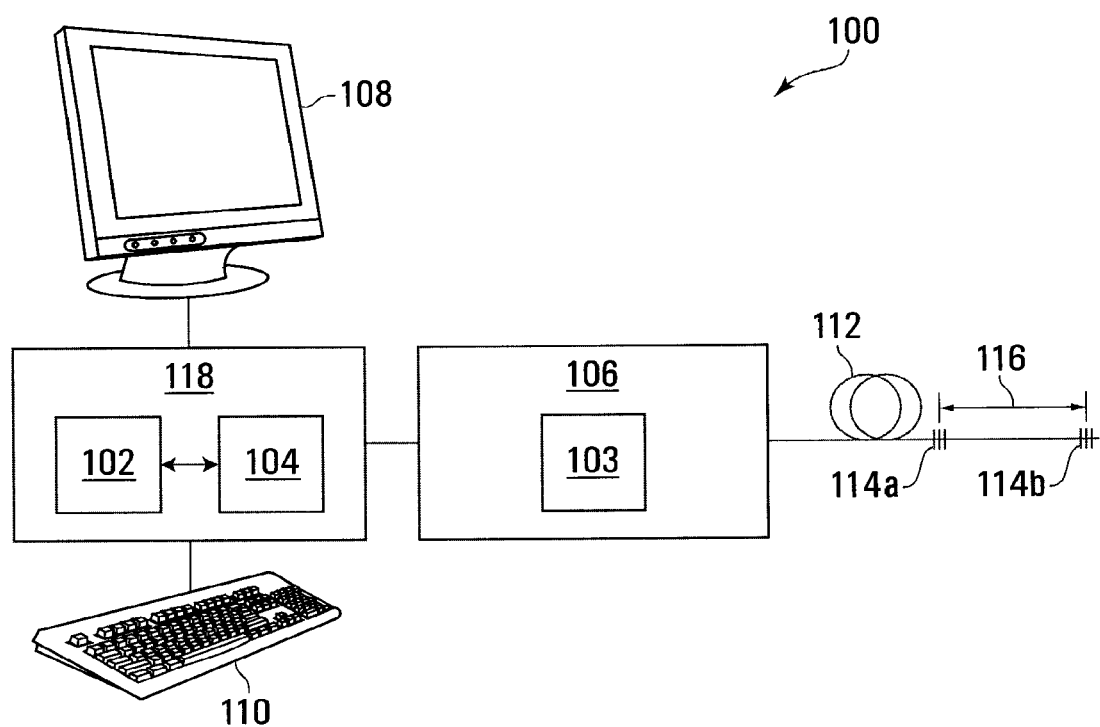
FIG. 1A is a block diagram of a system for determining whether an event has occurred from dynamic strain measurements, which includes an optical fiber with fiber Bragg gratings ("FBGs") for reflecting a light pulse, in accordance with an embodiment of the disclosure.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous SiO2). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz.

Control module 250 may also apply more complex signal processing methods to the output signal; example methods include those described in PCT application PCT/CA2012/000018 (publication number WO 2013/102252), the entirety of which is hereby incorporated by reference.

Figure 1B:
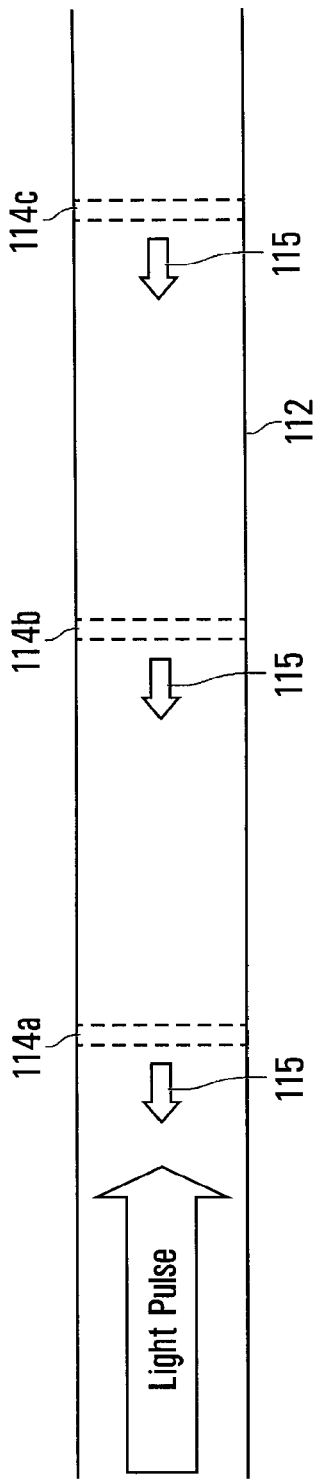
FIG. 1B is a schematic diagram that depicts how the FBGs reflect a light pulse.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference ($\Theta$) is as follows:

$$\theta = 2\pi nL/\lambda,$$

where n is the index of refraction of the optical fiber, L is the physical path length of the fiber segment 116, and $\lambda$ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

Figure 1C:
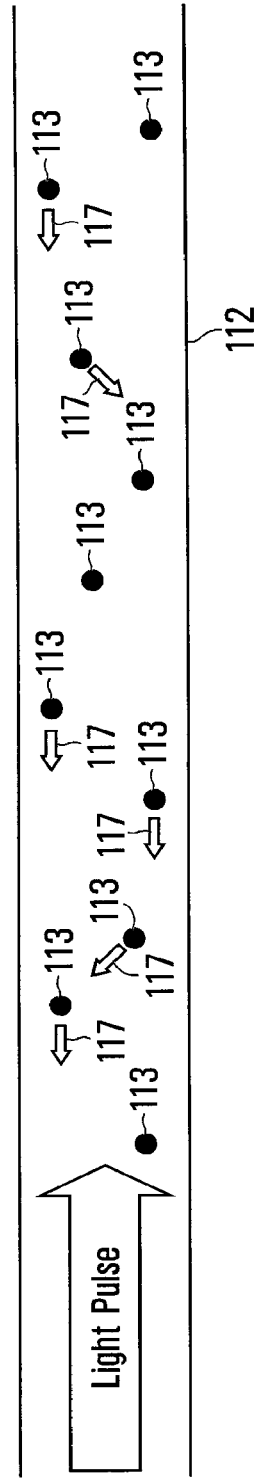
FIG. 1C is a schematic diagram that depicts how a light pulse interacts with impurities in an optical fiber that results in scattered laser light due to Rayleigh scattering, which is used for distributed acoustic sensing ("DAS")

One conventional way of determining $\Delta$ nL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
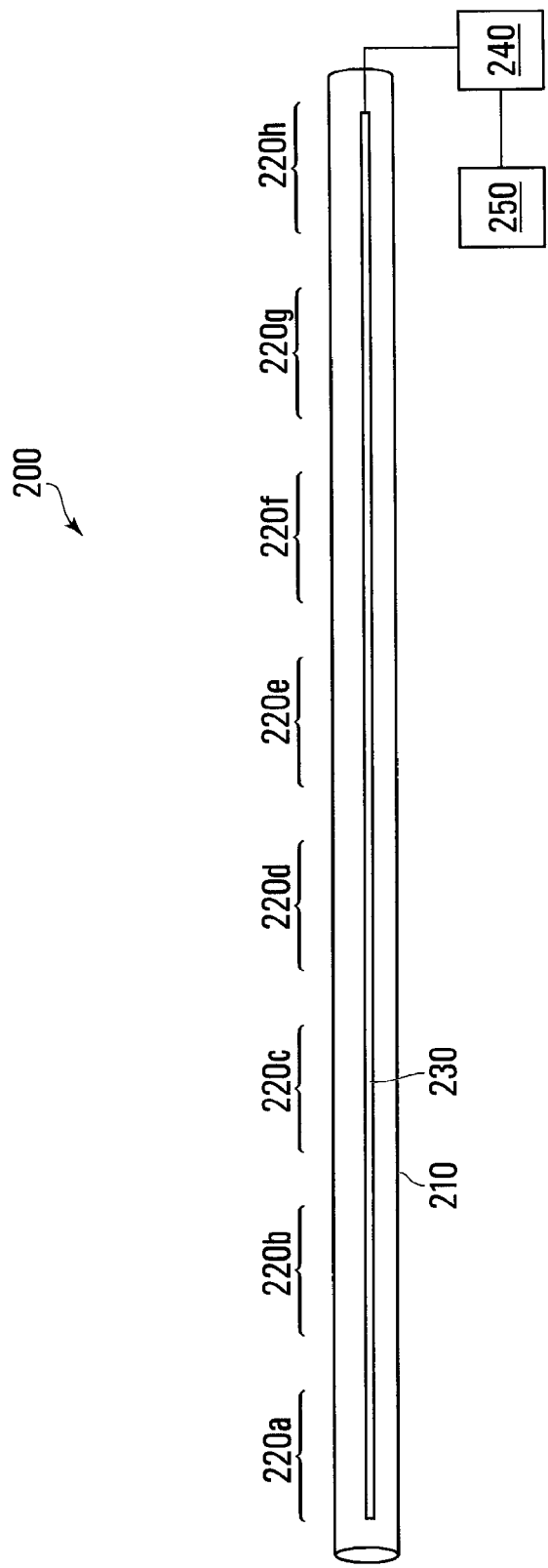
FIG. 2 is a schematic diagram of an optical interrogation system for detecting events in a pipeline, in accordance with an embodiment of the disclosure.

Referring now to FIG. 2, there is shown a system 200 for detecting events in a pipeline, in accordance with an embodiment of the disclosure. FIG. 2 shows a pipeline 210 divided into multiple segments, or channels 220a-h ("channels 220"). Each channel 220 corresponds to a portion of pipeline 210. For example, channel 220a may correspond to a portion of pipeline 210 that is proximate a road, whereas channel 220f may correspond to a portion of pipeline 210 that is relatively remote from any strong acoustic sources. Provided alongside pipeline 210 is a length of optical fiber 230. In some embodiments, optical fiber 230 may comprise multiple individual interconnected optical fibers. For example, in some embodiments each channel 220 may be associated with an individual length of optical fiber. In some embodiments, optical fiber 230 is attached to pipeline 210, whereas in other embodiments optical fiber 230 may be positioned within acoustic proximity of pipeline 210, meaning that optical fiber 230 is sufficiently close to pipeline 210 so as to detect acoustic energy originating from pipeline 210.

Optical fiber 230 is optically coupled to an interrogator 240. Interrogator 240 is configured to interrogate optical fiber 230 using optical fiber interferometry, as described above. Interrogator 240 is communicatively coupled to a control module 250. Control module 250 comprises one or more processors and one or more memories comprising computer program code executable by the one or more processors and configured, when executed by the one or more processors, to cause the one or more processors to perform any of the methods described herein. In some embodiments, control module 250 may be comprised within interrogator 240 such that interrogator 240 may perform the functions of control module 250.

There will now be described methods of detecting events in a pipeline, in accordance with embodiments of the disclosure. These methods may be implemented using for example system 200 of FIG. 2.

Figure 3:
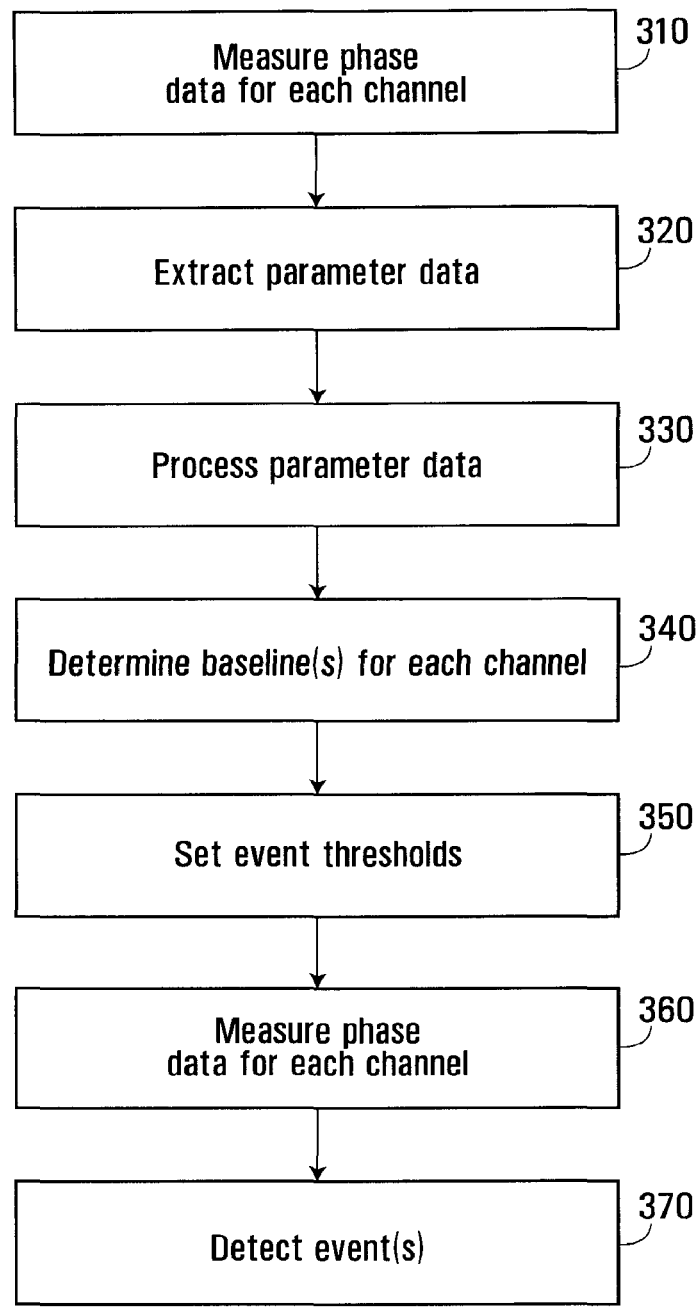
FIG. 3 is a flowchart showing a method of determining baselines for detecting events in a pipeline, in accordance with an embodiment of the disclosure.

Turning to FIG. 3, a method 300 commences at block 310 wherein control module 250 obtains phase data from pipeline 210. In particular, control module 250 obtains phase data for each of channels 220. Phase data is acquired by control module 250 controlling interrogator 240 such that interrogator 240 interrogates optical fiber 230 as described above. The phase data comprises raw data obtained by interrogator 240 and resulting from the interference of light pulses emitted by interrogator 240 into optical fiber 230, and reflected by FBGs (not shown) positioned in optical fiber 230. This phase data may be used as training data to train a baselining algorithm (described in further detail below) such that a baseline may be determined for each of channels 220. This training data may be input to the baselining algorithm in a post process mode or in real time.

After obtaining the phase data, control module 250 may optionally use one or more noise detection algorithms (of which various ones are known to those of skill in the art) to detect and remove various types of noise in the phase data (e.g. common mode noise which may be in the form of electrical 60 Hz harmonics coupling to the phase data at interrogator 240, or broadband noise caused by saturation of the optical receivers in interrogator 240).

At block 320, control module 250 extracts parameter data from the raw phase data. There are various ways in which parameter data may be extracted from the phase data—such methods are disclosed for example in PCT publication WO 2017/147679, the contents of which is incorporated by reference in its entirety.

Figure 4A:
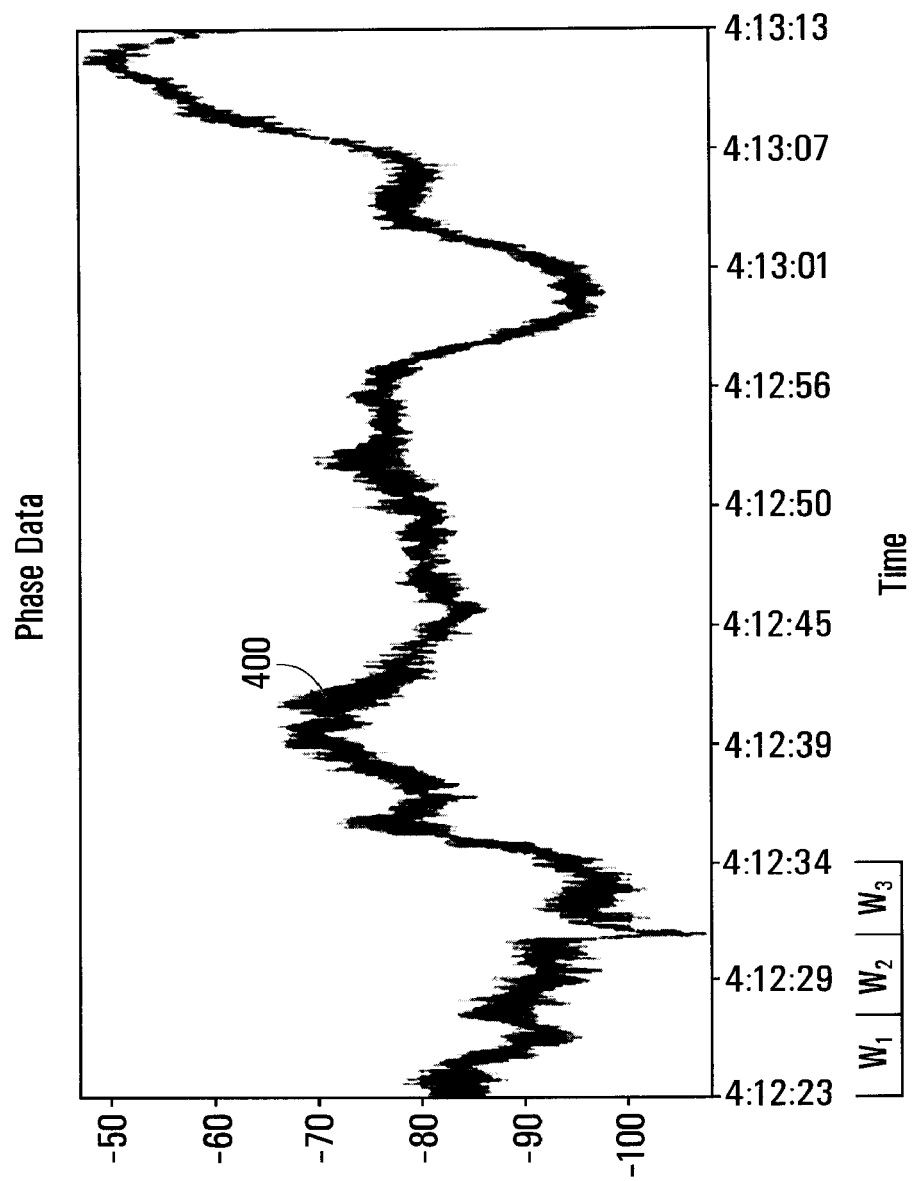
FIGS. 4A and 4B depict an example signal representing phase data acquired by the system of FIG. 2, with FIG. 4A showing unfiltered phase data and FIG. 4B showing filtered phase data.
Figure 4B:
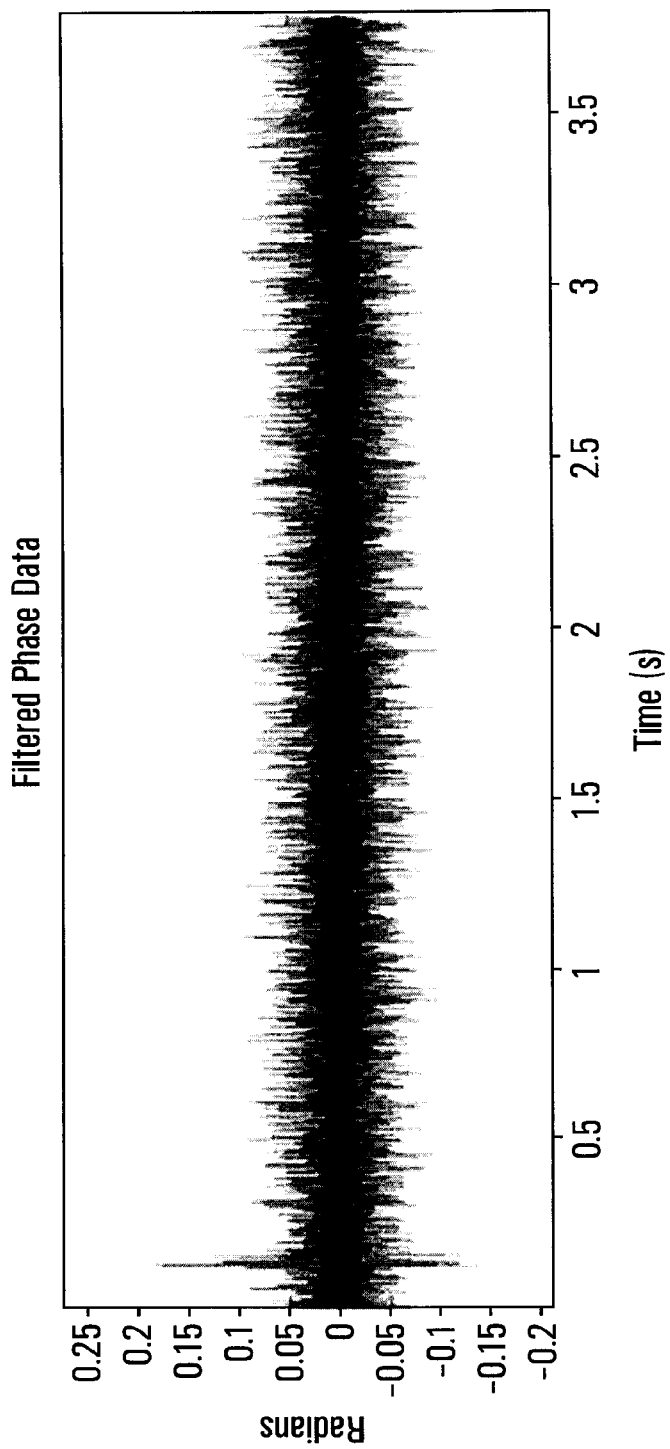

Referring now to FIGS. 4A and 4B, there is shown a signal 400 that represents phase data displayed to a user. The signal 400 is generated from an electrical signal interrogator 240 generates in response to light reflected from the FBGs being incident on a photodiode comprising part of interrogator 240. The photodiode generates an electrical signal in response to that incident light, which is digitized using an analog-to-digital converter, also comprising part of interrogator 240, and which is then processed to extract phase data therefrom, and the extracted phase data is transmitted to control module 250 for display. In an embodiment, interrogator 240 and control module 250 may be communicatively coupled via Ethernet.

Signal 400 expresses phase measurements in radians, and FIGS. 4A and 4B accordingly show the signal 400 as radians over time; FIG. 4A shows the unfiltered version of signal 400, while FIG. 4B shows a high-pass filtered version of signal 400. In the example embodiment, the high-pass filter's cut-off frequency is 10 Hz, although in different embodiments (not depicted) one or both of different types of filters and different cutoff frequencies may be used. Control module 250 divides signal 400 into event threshold windows w1 . . . wn. To illustrate this, signal 400 shown in FIG. 4A is divided into windows, with the first three windows w1 . . . w3 being labeled. In the depicted example embodiment, the duration of each of the windows is constant at 0.1 seconds (the windows depicted in FIG. 4A are not drawn to scale) and is empirically determined, taking into account data storage limitations, although in different embodiments window duration may differ and may be user configurable. However, in a different embodiment (not depicted) the duration chosen for each of the windows may vary.

In general, control module 250 extracts the parameter data mentioned above on a window-by-window basis. Example methods that control module 250 performs in order to extract the parameter data are described below.

Window Timestamp

Control module 250 applies a timestamp to each of the windows to correlate the portions of signal 400 to the windows for those portions; applying timestamps to the windows permits control module 250 to distinguish different windows from each other and to record the relative order of different windows. Control module 250 in this example embodiment uses the time corresponding to the beginning of each window as a timestamp, but in different embodiments control module 250 may additionally or alternatively use the time corresponding to a different portion of each window as the timestamp.

Measure of Magnitude of the Signal

In the example embodiment below, the measure of magnitude of signal 400 is the root mean square ("RMS") value of signal 400. However, in different embodiments (not depicted) the measure of magnitude of signal 400 may, for example, be the average value, peak value, or peak-to-peak value of signal 400.

Control module 250 determines the RMS value of the portion of signal 400 for each of the windows using Equation (1):

$$V_{RMS} = \sqrt{(x_1^2 + x_2^2 + x_3^2 + \ldots + x_N^2)} \quad (1)$$

where the window for which the RMS value is determined comprises n samples of the phase measurements and $x_N$ represents the magnitude of signal 400 for the Nth sample.

In a different embodiment (not depicted) in which signal 400 comprises an analog instead of a digital signal, control module 250 may determine the RMS value of signal 400 contained within any one of the windows as the square root of the integral of the square of signal 400 for that window.

In another different embodiment, the RMS value (regardless of whether signal 400 is discrete or continuous) may be modified by a scalar value. For example, control module 250 may divide the sum of squares in Equation (1) by N prior to taking the square root. Similarly, when signal 400 is continuous, control module 250 may divide the integral of the square of signal 400 by the duration of the window prior to taking the integral.

Frequency Centroid

Control module 250 determines the frequency centroid of the portion of signal 400 for each of the windows using Equation (2):

$$\text{Centroid} = \frac{\sum_{n=0}^{N-1} f_n \cdot x_n}{\sum_{n=0}^{N-1} x_n}$$

where $f_n$ is the frequency of signal 400 at sample n, $x_n$ is the magnitude of the frequency component at sample n, and there are N samples of signal 400 in the window. A Fast Fourier Transform ("FFT") may be used to determine the magnitude of the frequency components.

Additionally or alternatively, control module 250 may determine more than one frequency centroid for a given time period (e.g. for a window). For example, control module 250 may apply Equation (1) for any one or more of the windows for different frequency bands (e.g. one frequency centroid for 0 Hz-1,000 Hz, a second frequency centroid for 1,000 Hz-2,000 Hz, a third frequency centroid for 2,000 Hz-3,000 Hz, etc.). The frequency bands may or may not overlap (e.g. one frequency centroid for 0 Hz-1,500 Hz and a second frequency centroid for 1,000 Hz-2,500 Hz) and may or may not encompass all frequencies that occur during the time period (e.g. for a window in which frequencies are present from 0 Hz-3,000 Hz, there may be one frequency centroid for 0 Hz-1,500 Hz and a second frequency centroid for 2,000 Hz-3,000 Hz).

In a different embodiment (not depicted) in which signal 400 comprises an analog instead of a digital signal, control module 250 may replace $f_n$ with the continuous function f(n), $x_n$ with the continuous function x(n), and the summation from n=0 to n=N−1 may be replaced by the integral from n=0 to N.

In a further different embodiment, as with the RMS value, the frequency centroid (regardless of whether signal 400 is discrete or continuous) may be modified by a scalar value.

Harmonic Power

Figure 5:
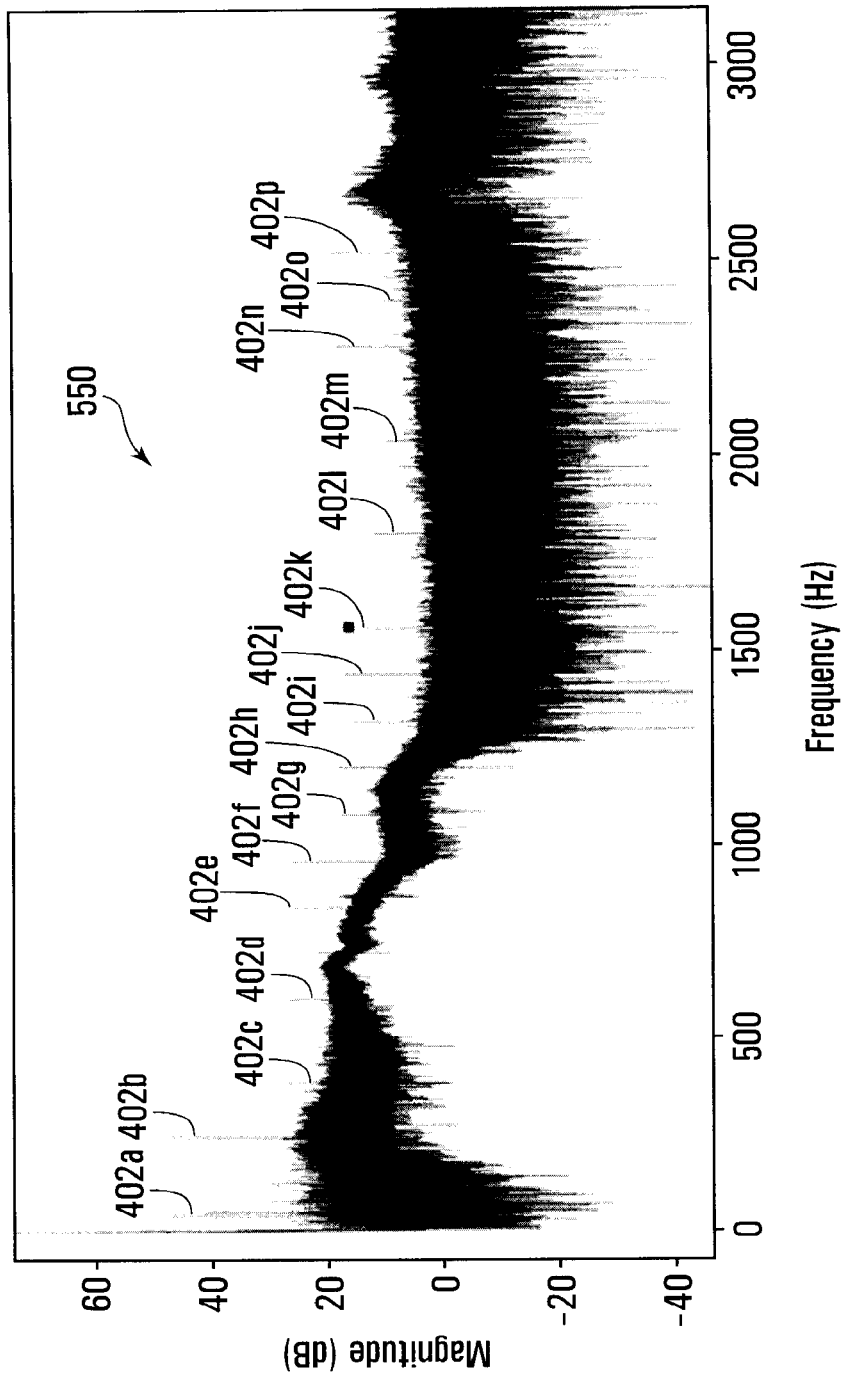
FIG. 5 is an example frequency domain representation of a portion of an unfiltered example signal representing phase data acquired by the system of FIG. 2 and contained in one of the windows.

Control module 250 determines the harmonic power of signal 400 for each of the windows by performing a method comprising the following:

Determining the frequency domain representation of the portion of signal 400, in the form of the power spectral density ("PSD") of signal 400, in the window being considered. For example, control module 250 may perform an FFT on the portion of signal 400 in each window. FIG. 5 shows an example frequency domain representation 550 of the portion of signal 400 contained in one of the windows.

Detecting a first set of peaks comprising any peaks in the frequency domain representation of signal 400. This may be done, for example, by identifying the sharp peaks in the frequency domain representation. A "sharp" peak is the magnitude of the frequency domain representation at a particular frequency ("peak frequency") that exceeds, by a certain sharp peak threshold, the average value of the frequency magnitudes at one or more neighboring frequencies. "Neighboring" frequency values may comprise frequency values within a certain range of frequencies higher and lower than the peak frequency. In one embodiment, the frequency range may be symmetrical about the peak frequency; alternatively, the frequency range may be asymmetrical about the peak frequency.

In a different embodiment (not depicted), control module 250 may identify all peaks, and not only sharp peaks. Additionally or alternatively, control module 250 may identify only the N most powerful peaks, wherein N is an integer.

The frequency domain representation 550 of FIG. 5 shows sixteen example sharp peaks, labeled 402a . . . p, which control module 250 may identify as described above.

After identifying the first set of peaks, control module 250 identifies a second set of peaks comprising those peaks at frequencies that are integer multiples of each other (e.g., 60 Hz, 120 Hz, 180 Hz, 240 Hz, etc.). Control module 250 sums the total power of these peaks comprising the second set of peaks to determine the total power of the harmonic identified by the lowest peak frequency (e.g. the total power at the 60 Hz, 120 Hz, 180 Hz, 240 Hz, etc., harmonics is referred to as the power of the 60 Hz harmonics).

Additionally or alternatively, control module 250 may also perform peak smoothing. In one example embodiment, control module 250 may apply a moving average or median filter to smooth the peaks of the frequency domain representation 550. For example, in one embodiment, for each frequency of the frequency domain representation 550, control module 250 selects the magnitude at that frequency and at a certain number of frequencies surrounding that frequency (e.g. magnitudes at the five frequencies immediately higher and lower than that frequency), sorts the magnitudes at those selected frequencies by magnitude, and averages a certain number of those magnitudes around the median value to determine an average magnitude for those selected frequencies. Control module 250 then uses that average magnitude as the magnitude for all of those selected frequencies.

Spectral Flux

Control module 250 determines the spectral flux of signal 400 for each of the windows by performing a method comprising the following:

Control module 250 determines the frequency domain representation of signal 400, in the form of the PSD for a certain duration of signal 400 that includes the window for which the spectral flux is to be determined. For example, in one embodiment determining the PSD for five seconds of the signal at a resolution of 1 Hz is suitable.

As described above under the heading, "Harmonic Power", control module 250 determines the peaks in the frequency domain representation 550 of signal 400 that represent harmonics. Control module 250 then removes the most powerful N bands from consideration to reduce the contribution to total spectral power by those harmonics. N may be any suitable number in view of the number and strength of the harmonics present in the signal; for example, in one embodiment N may be selected to be twenty.

Once control module 250 has removed the harmonics from signal 400, it determines the post-harmonic spectral flux of signal 400 using Equation (3):

$$F_i = \Sigma_{j=1}^{N}(P_{ij} - P_{ij-1})^2 \quad (3)$$

where, for any one of the windows, i represents each time slice, $F_i$ is the flux of the $i^{th}$ time splice, and $P_i$ and $P_{i-1}$ represent the PSD vectors of the $i^{th}$ and i−1 time slices. N represents the number of frequency bands over which the flux is determined according to Equation (4):

$$N = \frac{(f_{max} - f_{min})}{\Delta f} \quad (4)$$

where $f_{max}$ and $f_{min}$ are user selected, with $f_{max}$ being, at most, the maximum frequency present in the Fourier Transform of the signal and with $f_{min}$ being, at lowest, the minimum frequency present in the Fourier Transform of the signal. In one example embodiment, $f_{min}$ is 0 Hz and $f_{max}$ is one half of the sampling frequency (e.g. when the sampling frequency is 6 kHz, $f_{max}$=3 kHz). In Equation (4), $\Delta f$ is the frequency resolution used to determine the PSD vectors.

Figure 6:
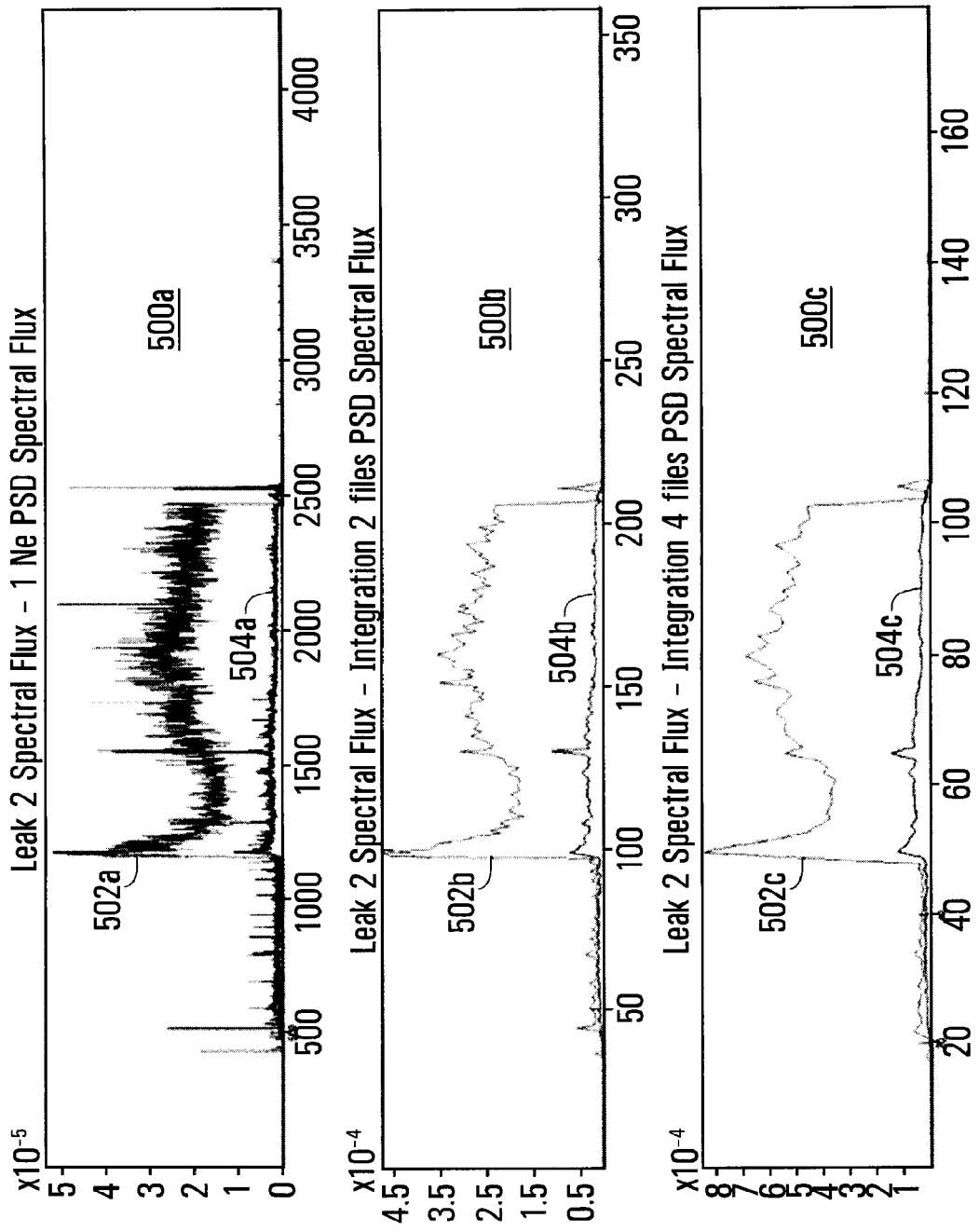
FIG. 6 shows three graphs of spectral flux, each averaged over a different time period, and generated using the phase data acquired by the system of FIG. 2.

FIG. 6 shows first through third graphs 500a-c of spectral flux for a signal, each averaged over approximately 5 hours. The graphs 500a-c are of power density vs. frequency. The first graph 500a is generated using a window duration of 5 seconds, the second graph 500b is generated using a window duration of 8 seconds, and the third graph 500c is generated using a window duration of 16 seconds. Each of the graphs 500a-c comprises data from two channels: a first channel is used to generate a first set of power density curves 502a-c and a second channel is used to generate a second set of power density curves 504a-c, with the first channel experiencing more power spectral density flux than the second channel.

Strain

Strain is a good indicator of low-frequency activity in the environment, such as ground movement or seismic waves. In the context of fiber optic sensing, often the extremely low-frequency content of the raw data, e.g. f<0.1 Hz, is affected by slow thermal changes in the environment such as daily temperature cycles. Thus, it is often beneficial to remove this extremely low frequency content while maintaining the remainder of the low-frequency content of the raw data, e.g. 0.1 Hz<f<1 Hz.

The magnitude of a particular strain event may be extracted from the raw data by various methods. One method makes use of a bandpass pass filter such as a Butterworth filter with a low cut-off frequency of 0.1 Hz and a high cut-off frequency of 10 Hz. Another method could use a median filter to estimate the very low frequency envelope of the data by effectively eliminating the relatively higher-frequency strain events. The derived data envelope can be subtracted from the raw data to isolate the strain events. A low-pass filter with a cut-off of approximately 10 Hz may be further applied to the data to eliminate the higher-frequency acoustic events. Another method may rely on the linear detrending of the raw data to eliminate the extremely low frequencies, though this method would be most effective if applied to a very short duration of data. Another method may rely on the self-calibration of data by subtracting any given sample from a sample which was recorded a fixed time in the past, e.g. 10 seconds ago. This method would have the effect of removing the extremely low frequency envelope of the signal and leaving behind the relatively higher-frequency strain events.

Magnitude (e.g. RMS) of the phase data, frequency centroid, spectral flux, harmonic power, and strain are examples of parameter data that control module 250 extracts from the phase data.

Following extraction of the parameter data, at block 330 (referring back to FIG. 3) control module 250 processes the parameter data for each channel 220 and calculates its mean, median, standard deviation, and variance (these may be referred to as "statistical parameter data"). Other statistical parameters may also be calculated. Control module 250 then generates a table including the statistical parameter data, and in particular the mean, median, standard deviation, and variance for each "parameter" of the parameter data (e.g. RMS of the phase data, frequency centroid, spectral flux, strain, and harmonic power), for all channels 220.

Control module 250 then generates a number of graphs in which the parameter data and the statistical parameter data are plotted for the training period. The accuracy of the statistical parameter data can be verified by an operator. Any particular anomalies in the training data will be noted and analyzed by the operator. The operator may choose to have any potential anomalies discounted for the purposes of establishing the baselines.

At block 340, one or more baselines are determined using the statistical parameter data. A baseline generally comprises two values: a mean or a median of the parameter data, and a standard deviation of the parameter data, based on the mean/median. In other embodiments, a baseline may comprise more or fewer than two values.

Control module 250 exports the statistical parameter data into a lookup table (LUT) which is used for event detection, as described below. Once the statistical parameter data for each channel is identified, control module 250 may automatically define thresholds for anomalous events ("anomalies"). In order to assist in event detection, an event identification graphical user interface (EIG), such as the one described in PTC publication WO 2017/147679 (herein incorporated by reference in its entirety), may be used.

The EIG allows the operator to define an event/anomaly as having occurred when the magnitude of one or more parameters falls within a pre-defined range. For example, an acoustic event may be defined as when the acoustic RMS magnitude is determined to be 2 radians greater than the corresponding baseline. As another example, a third party interference may be defined as when the acoustic RMS magnitude is determined to be 2 radians greater than the corresponding baseline, and when the strain deviation is determined to be 50 radians greater than the corresponding baseline.

At block 350, control module 250 determines one or more event thresholds for each channel 220. Control module 250 automatically defines anomalies based on deviations of one or more parameters from the corresponding baseline(s) of each individual channel. Using the statistical parameter data in the LUT, anomaly detection indicators and an anomaly severity indicator can be calculated for a given parameter as follows:

Anomaly detection indicator$(i,j)=1$ if (parameter value$(i,j)$−mean$(i,j))/(M^*\text{std}(i,j))>1$;

Anomaly detection indicator$(i,j)=0$ if (parameter value$(i,j)$−mean$(i,j))/(M^*\text{std}(i,j))<1$; and Anomaly severity indicator$(i,j)=$(parameter value$(i,j)$−mean$(i,j))/\text{std}(i,j)$, where:
parameter value (i,j) is the current value of parameter (i) in the parameter data (for example, the RMS magnitude of the acoustics) for channel j;
mean is the mean value for parameter (i) and channel (j), as stored in the LUT;
std is the standard deviation value for parameter (i) and channel (j), as stored in the LUT; and
M is a scalar and may be a default number of standard deviations above the mean for an event to be considered an anomaly.

If the anomaly detection indicator is determined to be 1, then an event is determined to have occurred at that channel. If the anomaly detection indicator is determined to be 0, then no event is determined to have occurred at that channel.

The anomaly severity indicator indicates the relative severity or seriousness of the anomaly. The higher the anomaly severity indicator, the more significant the deviation of that particular parameter from the corresponding baseline. Control module 250 inputs the anomaly severity indicators to the EIG, where they are used to assist in event detection. Note that the above formulae automatically tie the event threshold(s) for each channel to their respective baseline(s). In the above equations, the baseline is defined by the mean and the standard deviation, these being extracted from the parameter data. The event threshold then is defined as (mean+M*std_dev). M may be a user-defined scalar. The greater M is, the greater the magnitude of an event in order for it to be identified as an anomaly. In the example of an acoustic event, the RMS threshold (in radians) for each channel is dependent on how loud its baseline was on average (which is reflected in the mean for that channel) and how high the standard deviation was for that channel's RMS.

For example, an acoustic event may be defined as an event with an acoustic anomaly severity indicator of 3, meaning that if the magnitude of the acoustics parameter for a given channel is 3 standard deviations (or more) higher than the mean recorded for that channel during the baselining period, then an acoustic anomaly is detected. Note that since the event thresholds for each channel are tied to their respective baselines, a "quiet" channel may have an acoustic anomaly threshold of 0.1 radians, whereas a "loud" channel (e.g. one close to a strong acoustic source) may have an acoustic anomaly threshold of 1.5 radians.

It is possible to define new events by using a combination of multiple anomalies. For example, a pipeline flow anomaly may be defined such that both a strain anomaly and an acoustic RMS anomaly must be present for the event to be detected. It is also possible to make use of the severity indicator in the definition of an event. For example, a major flow anomaly may be defined as having a strain anomaly severity indicator of 5 and an acoustic anomaly severity indicator of 3, while a minor pipeline flow anomaly may be defined as having a strain anomaly severity indicator of 2 and an acoustic anomaly severity indicator of 1.

The table below shows an example of how control module 250 stores the raw phase data (with a sampling frequency of $F_s$).

| Timestamp | Ch 1 | Ch 2 | Ch 3 | ... |
|---|---|---|---|---|
| 0 | data | data | data | data |
| $1/F_s$ | data | data | data | data |
| $2/F_s$ | data | data | data | data |
| $3/F_s$ | data | data | data | data |
| ... | data | data | data | data |

The table below shows how control module 250 stores the parameter data extracted from the raw phase data for a single channel. $F_{summ}$ is the sampling rate for the parameter data. In this case, two of the parameters are RMS and strain.

| Timestamp | RMS | Strain | ... |
|---|---|---|---|
| 0 | RMS value | Strain value | Parameter value |
| $1/F_{summ}$ | RMS value | Strain value | Parameter value |
| $2/F_{summ}$ | RMS value | Strain value | Parameter value |
| $3/F_{summ}$ | RMS value | Strain value | Parameter value |
|  | RMS value | Strain value | Parameter value |

The table below shows how control module 250 stores in the LUT the statistical parameter data for the parameter data for different channels. The table may be calculated using a preset amount of time dedicated to the initial baselining process (e.g. 1 day, 2 weeks, etc.). The statistical parameter data in this case comprises mean and standard deviation ("std").

| Channel | RMS mean | RMS std | Strain mean | Strain std | ... |
|---|---|---|---|---|---|
| 1 | 0.1 | 0.01 | 50 | 3 | ... |
| 2 | 0.15 | 0.02 | 200 | 15 | ... |
| 3 | 2.5 | 0.1 | 40 | 7 | ... |
| 4 | 0.75 | 0.05 | 36 | 2 | ... |
| ... | ... | ... | ... | ... | ... |

Figure 7A:
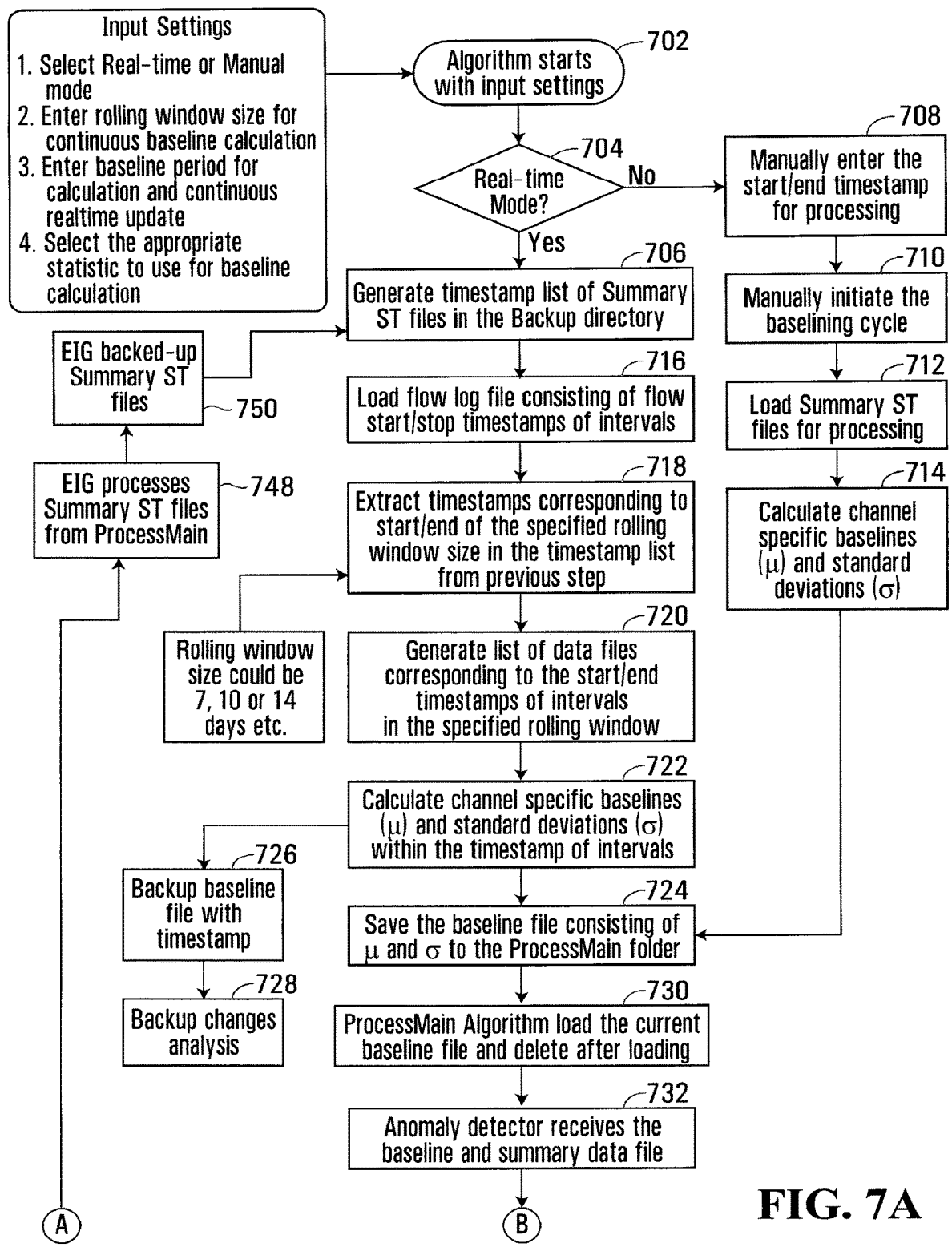
FIGS. 7A and 7B are portions of a flowchart showing a method of determining baselines for detecting events in a pipeline, in accordance with an embodiment of the disclosure.
Figure 7B:
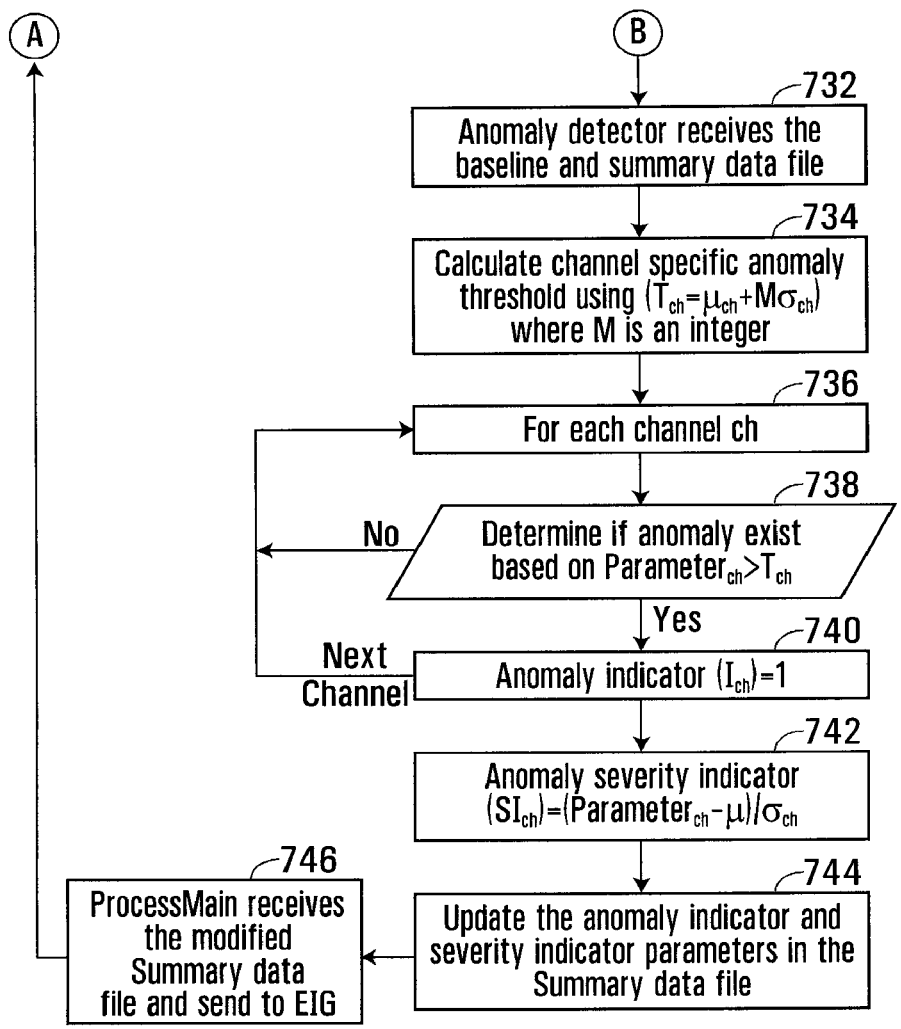

Referring now to FIGS. 7A and 7B, there is shown another embodiment of a method of detecting events in a pipeline or wellbore, in accordance with another embodiment of the disclosure.

At block 702, control module 250 receives input settings. Input settings include: a selection of whether or not the baselining process will proceed in real-time mode or manual mode; a rolling window size; a baseline period; and a statistic for use in determining the baselines. At block 704, control module 250 determines whether a real-time mode or a manual mode was entered. If a manual mode was entered, then at block 708 control module 250 receives as an input start and end timestamps for the baselining process. For example, a user may enter a period of 1 week for the baselining process. At block 710, the baselining process is initiated by manual input. Control module 250 will proceed to obtain raw phase data from interrogator 240 as described above. At block 712, control module 250 extracts parameter data from the phase data. At block 714, using the extracted parameter data, control module 250 determines a baseline for each channel, each baseline comprising a mean (μ) of the parameter data and a standard deviation (σ) of the parameter data. The process then proceeds to block 724.

Returning to block 704, if a real-time mode was entered, then at block 706 control module 250 generates a timestamp list of parameter data stored in a backup directory. At block 716, control module 250 loads a flow log file indicating the start and stop timestamps of flow within the conduit. At block 718, using the timestamp list of parameter data and the flow log file, control module 250 determines which particular data segments to process for the calculation of the baseline parameters. In the case of pipeline baseline parameter extraction, it is often preferred to use data from times when the pipeline is in its normal operating conditions, i.e. flowing. For example, using the timestamp list of parameter data, control module 250 may select a two-week period from November 1 to November 15 and, using the flow log file, may decide not to use data from 1 PM to 7:30 PM on November 10 because there was no flow in the pipeline during that time period. At block 720, using the timestamps extracted at block 718, the files containing the relevant data are retrieved from a database. The data contained in these files is used at block 722 for parameter extraction.

At block 722, control module 250 determines a baseline for each channel, each baseline comprising a mean (μ) of the parameter data and a standard deviation (σ) of the parameter data. At block 724, the baselines are saved. At block 726, the file containing the baselines is backed up with the associated timestamps. As mentioned earlier, it is possible to repeat the baselining process for a particular pipeline or wellbore multiple times, for example during different seasons. At block 728, control module 250 compiles a report on the differences observed to exist between various baselines extracted for the same monitored segment.

At block 730, the file containing the baselines is loaded. At block 732, an anomaly detector module receives the baseline file and associate parameter data.

Now referring to FIG. 7B, at block 734 control module 250 determines for each channel an anomaly threshold according to: $T_{ch}=\mu_{ch}+M\sigma_{ch}$, wherein $\mu_{ch}$ is the mean of the parameter data for that channel, $\sigma_{ch}$ is the standard deviation of the parameter data for that channel, M is a scalar greater than 0, and $T_{ch}$ is the anomaly threshold for that channel. At blocks 736 and 738, control module 250 determines whether an anomaly/event exists by determining whether $Parameter_{ch} > T_{ch}$, wherein $Parameter_{ch}$ is the value of the parameter under consideration for that channel. If no event is detected, control module 250 proceeds to block 736 where event detection is performed for the next channel. If an event is detected, at block 740 an anomaly indicator $I_{ch}$ is set to 1. At block 742, an anomaly severity indicator can be determined as the ratio of the difference between the current parameter and its mean to the standard deviation for that parameter. Event detection is repeated for all channels.

At block 744, the anomaly indicator and anomaly sigma ratio parameters are updated for all channels in a summary data file (comprising the parameter data). At block 746, the updated summary data file is sent for display on an event detection graphical user interface. At block 748 (FIG. 7A), the summary data file is processed for display such that the operator may identify events occurring in specific channels. At block 750, the summary data file is backed up, at which point the process returns to block 706.

It will be apparent to the skilled person that FIGS. 7A and 7B show merely one possible method of determining and implementing baselines for event detection, and that a greater or fewer number of steps may be implemented by control module 250.

Referring now to FIGS. 8-20, there are shown various plots obtained using one or more of the methods described herein.

In FIGS. 8-13, over 5 hours of no-flow/flow data was obtained using an optical interrogator as described above. The mean, median and standard deviations were estimated for different window sizes (30 secs, 60 secs and 240 secs) for flow and no-flow conditions. The window used was a moving window. The baseline for each parameter (such as the RMS) was calculated and includes average of all estimated mean values for each window position. The calculations were repeated for each channel in the pipeline.

Figure 8:
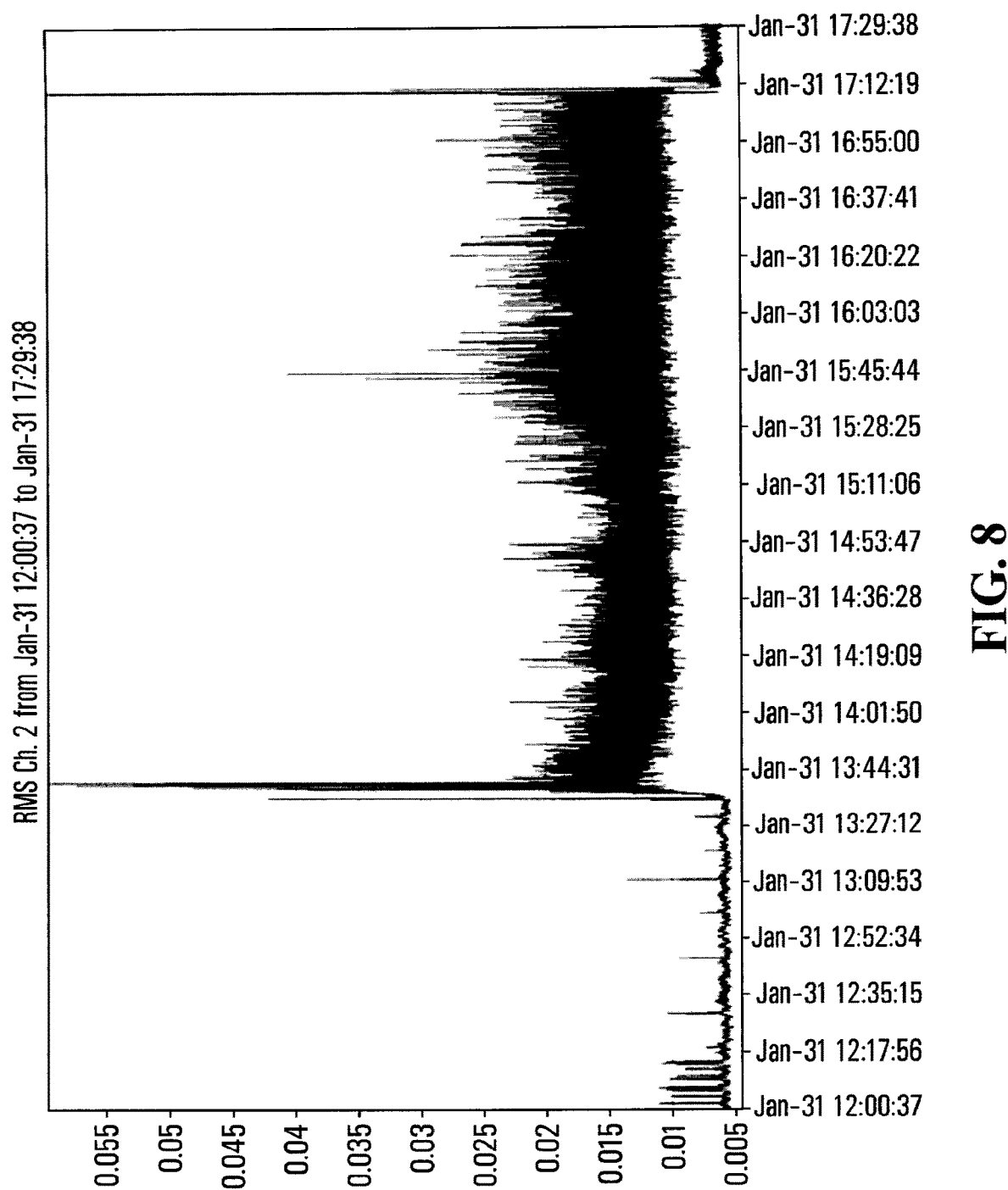
FIG. 8 is a plot of RMS over time.
Figure 9:
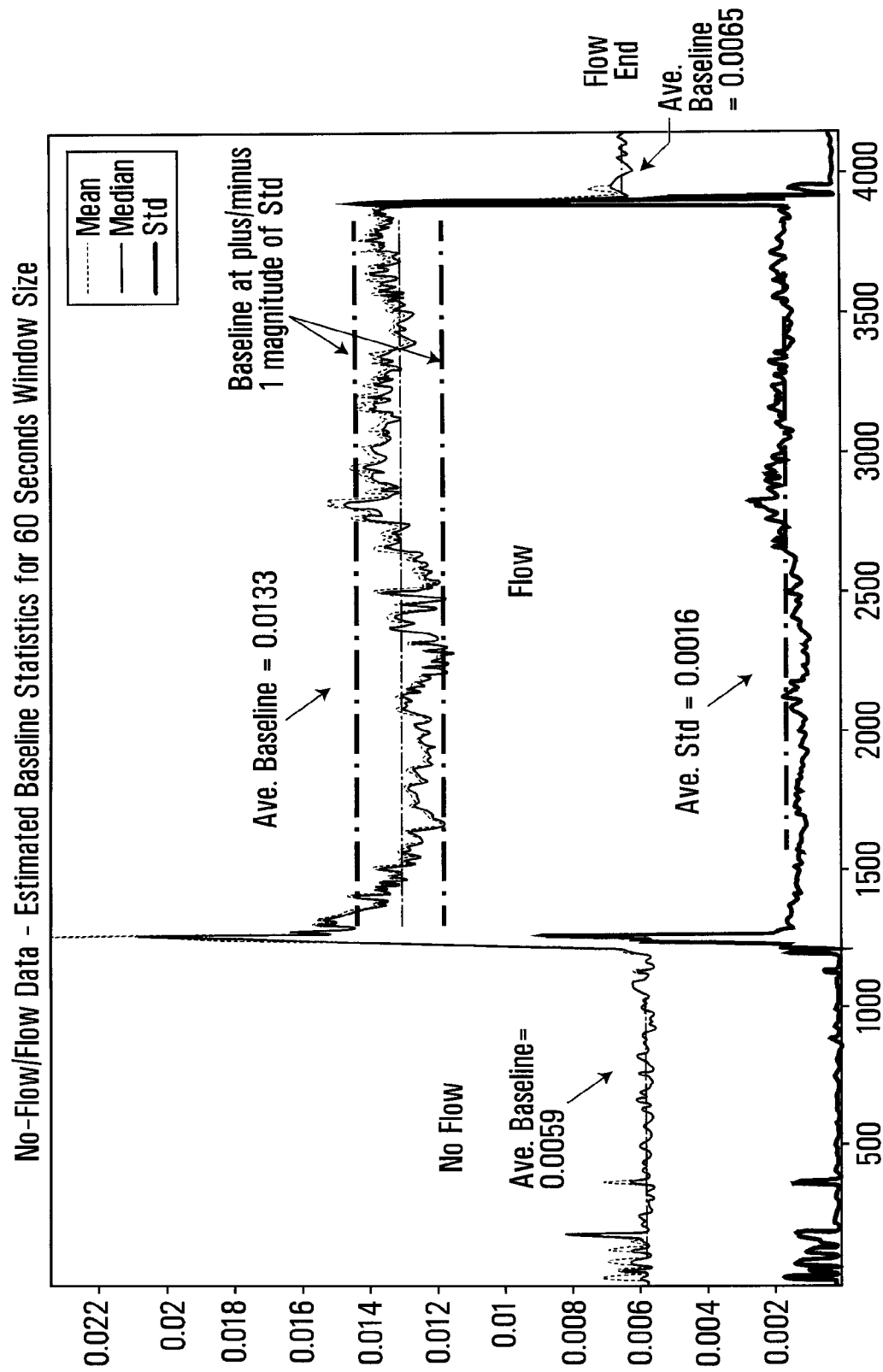
FIG. 9 is a plot showing different baselines under flow and no flow conditions.

FIG. 8 shows the RMS of acoustics as a function of time. The central portion with higher RMS corresponds to a period during which a fluid was flowing through the pipeline. Turning to FIG. 9, there are shown the calculated mean, median and standard deviation for the RMS data of FIG. 8. The baseline during flow can be seen to be more than double the baseline when no flow is occurring. Using a baseline established during flow may be preferable. The calculated baselines do not include the spikes observable at the transitions from no-flow to flow, and from flow to no-flow.

Figure 10A:
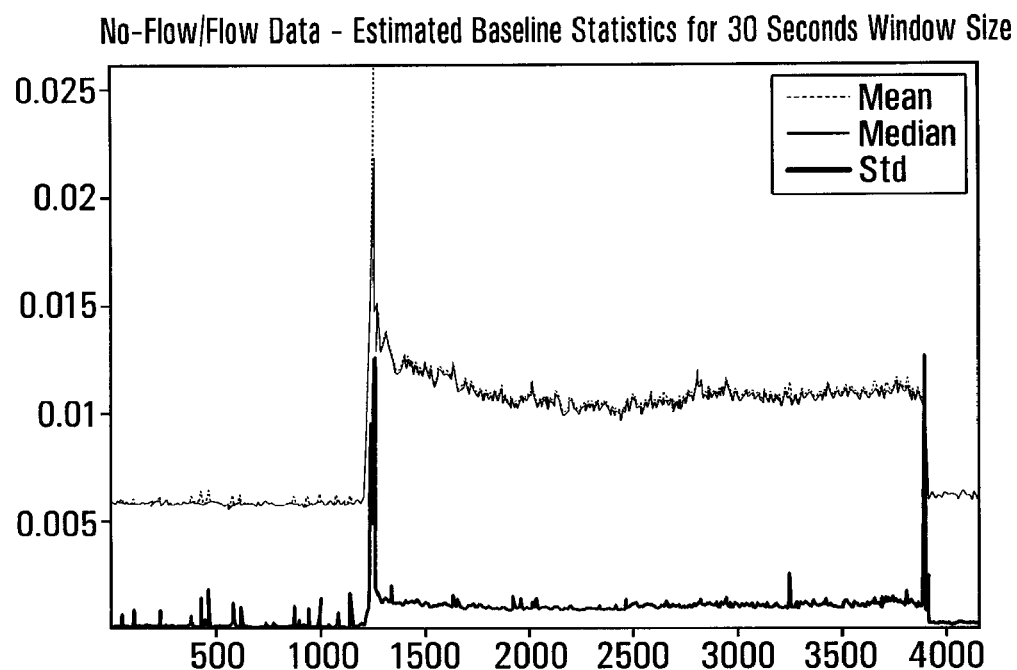
FIGS. 10A-10C are plots of statistical parameter data for different window sizes.
Figure 10B:
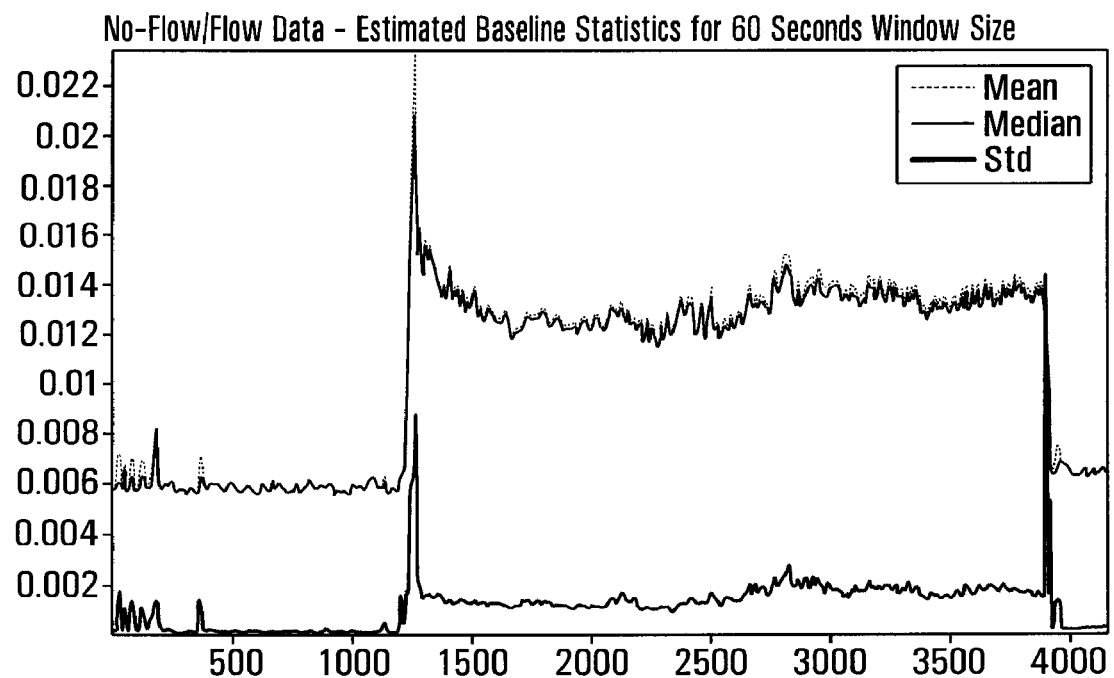
Figure 10C:
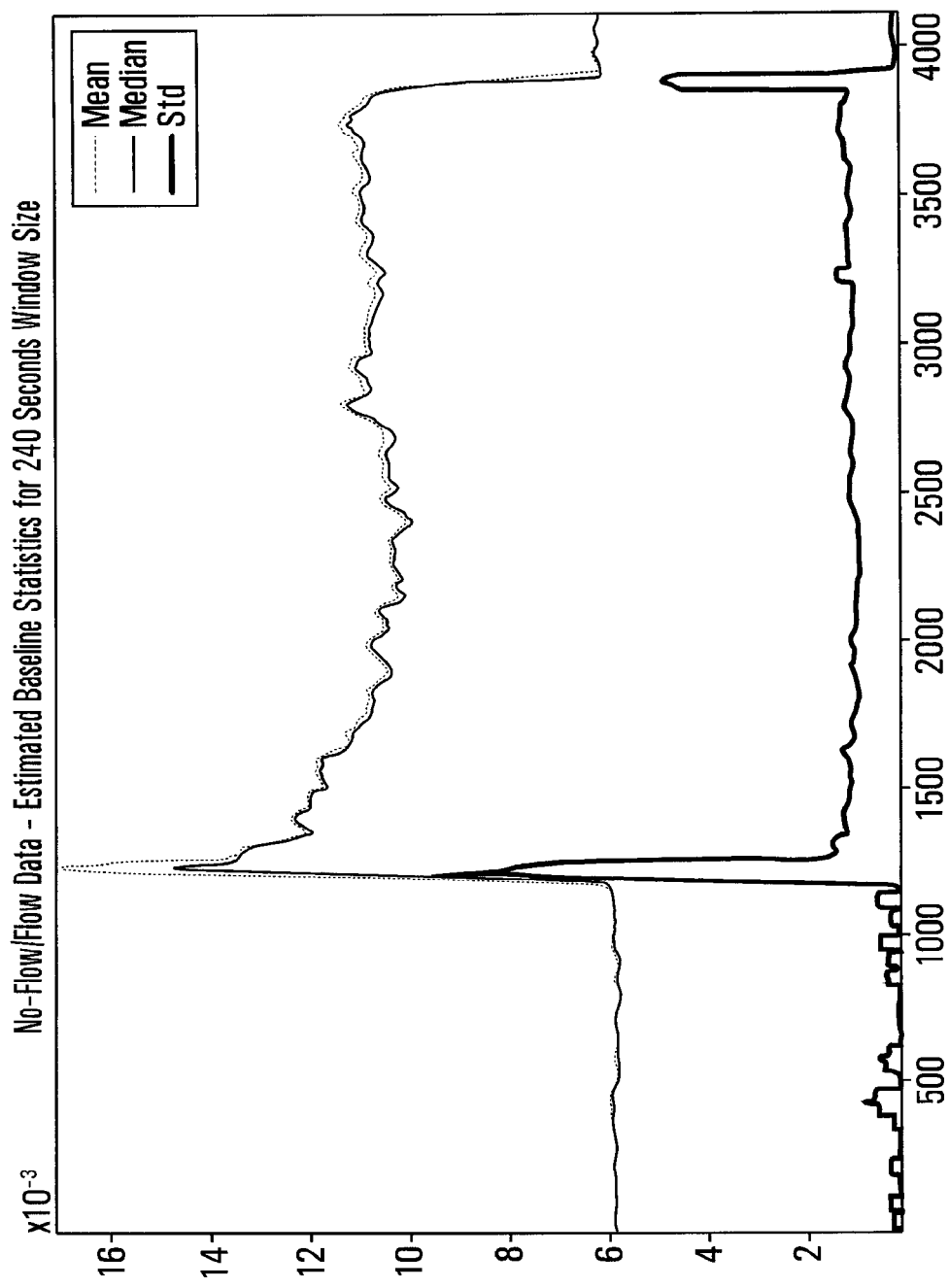

In FIGS. 10A-10C, there are shown plots of statistical parameter data (mean, median and standard deviation) for different window sizes. Larger windows show greater smoothening of the statistical parameter data. The effect of different window sizes is most prominent during an event or spike.

Figure 11:
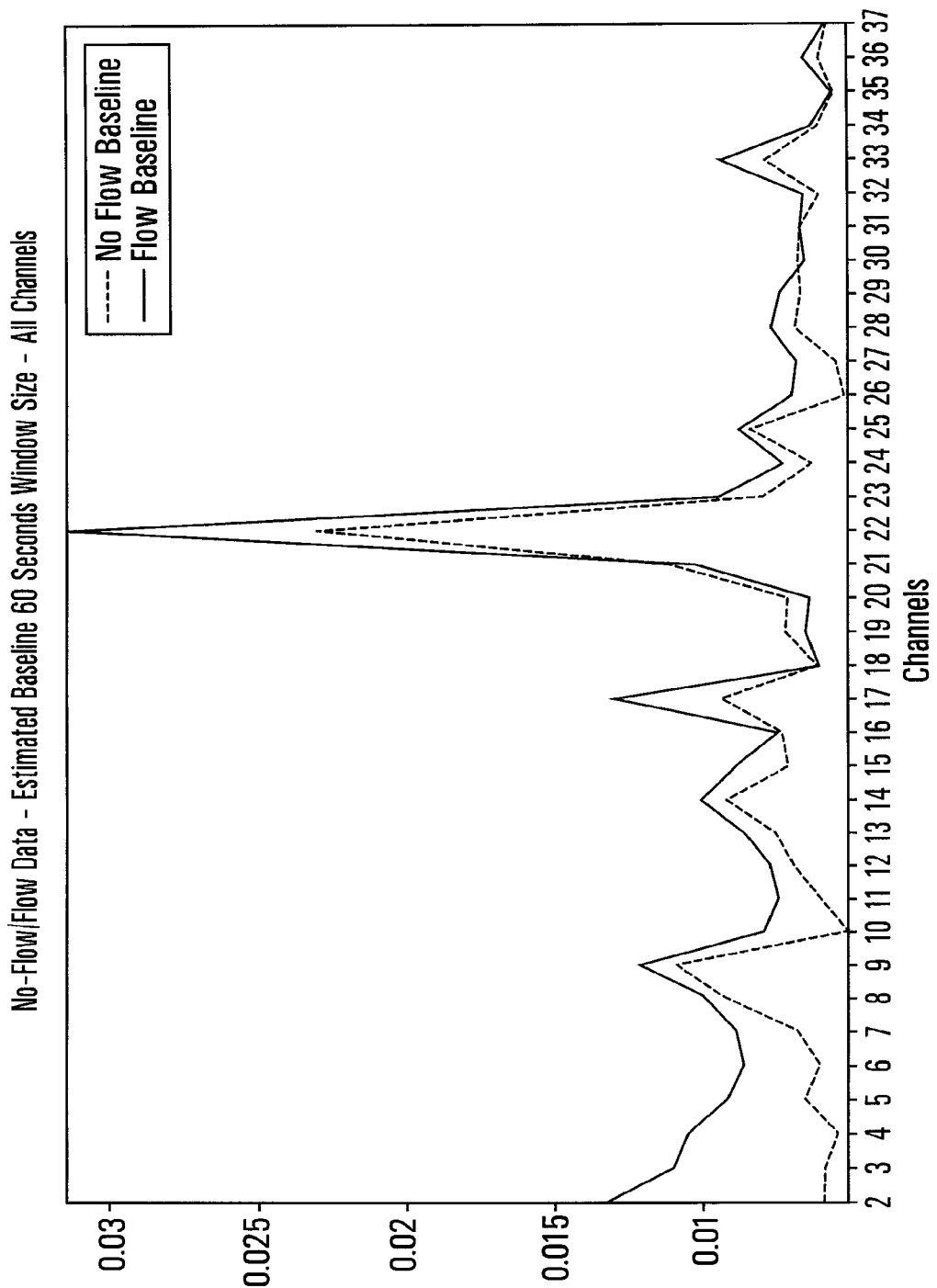
FIG. 11 is a plot showing baseline magnitudes as a function of channel in a pipeline.

FIG. 11 shows the estimated baselines for multiple channels of a monitored segment of a pipeline. The baselines for the channels which are closer to pump stations (in this example channels 1-8) are generally higher than for later channels due to flow acoustics. The baselines for channels 21, 22 and 23 are much higher, suggesting that these portions of the pipeline are close to strong acoustic sources.

FIG. 12 shows a table of extracted RMS data for the different channels of the pipeline, under flow and no-flow conditions.

Figure 13:
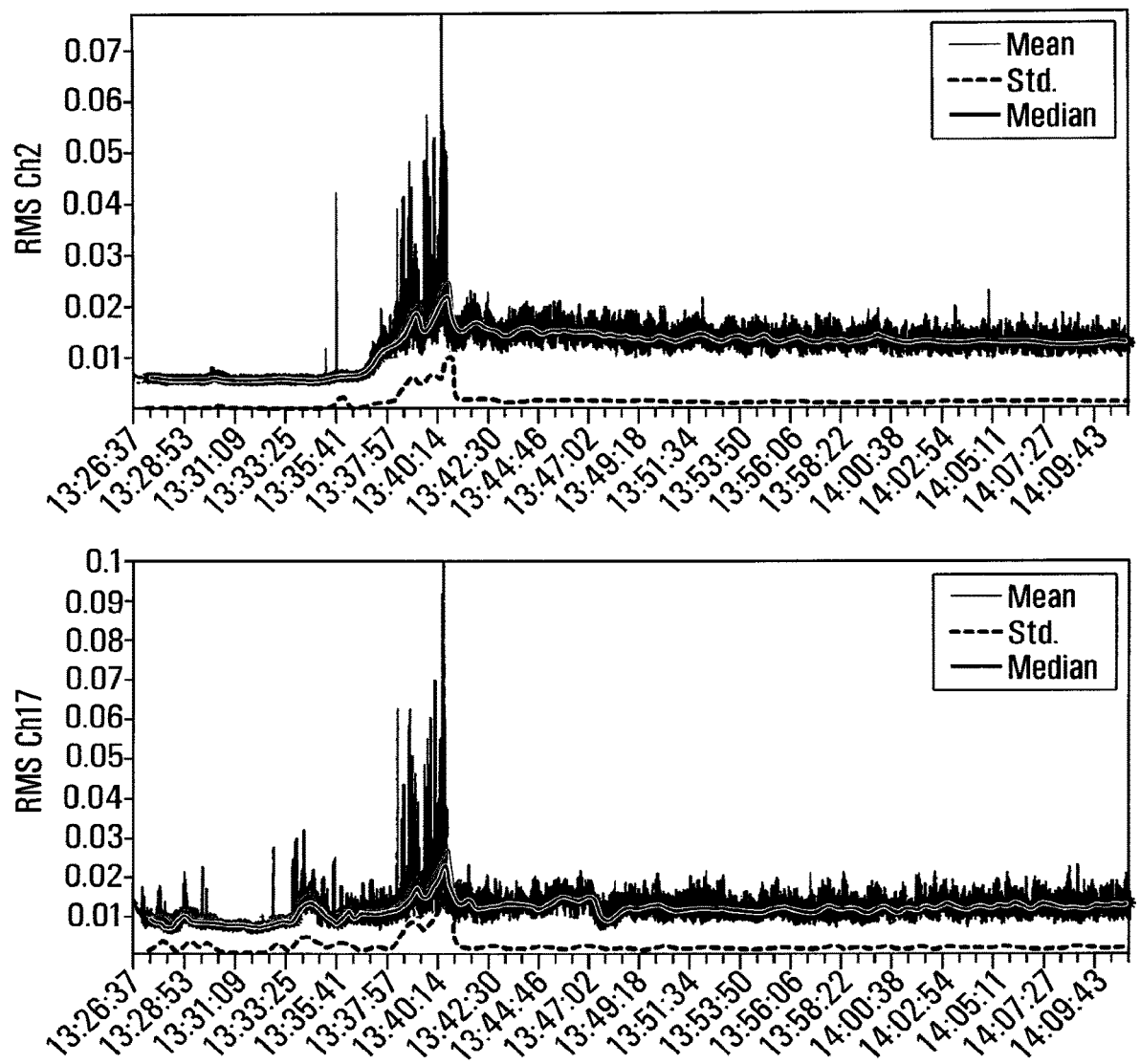
FIGS. 13-16 are plots showing statistical parameter data based on RMS for two different channels of a pipeline.

FIG. 13 shows a plot of RMS and statistical parameter data (mean, median and standard deviation) for channels 2 and 17.

Figure 14:
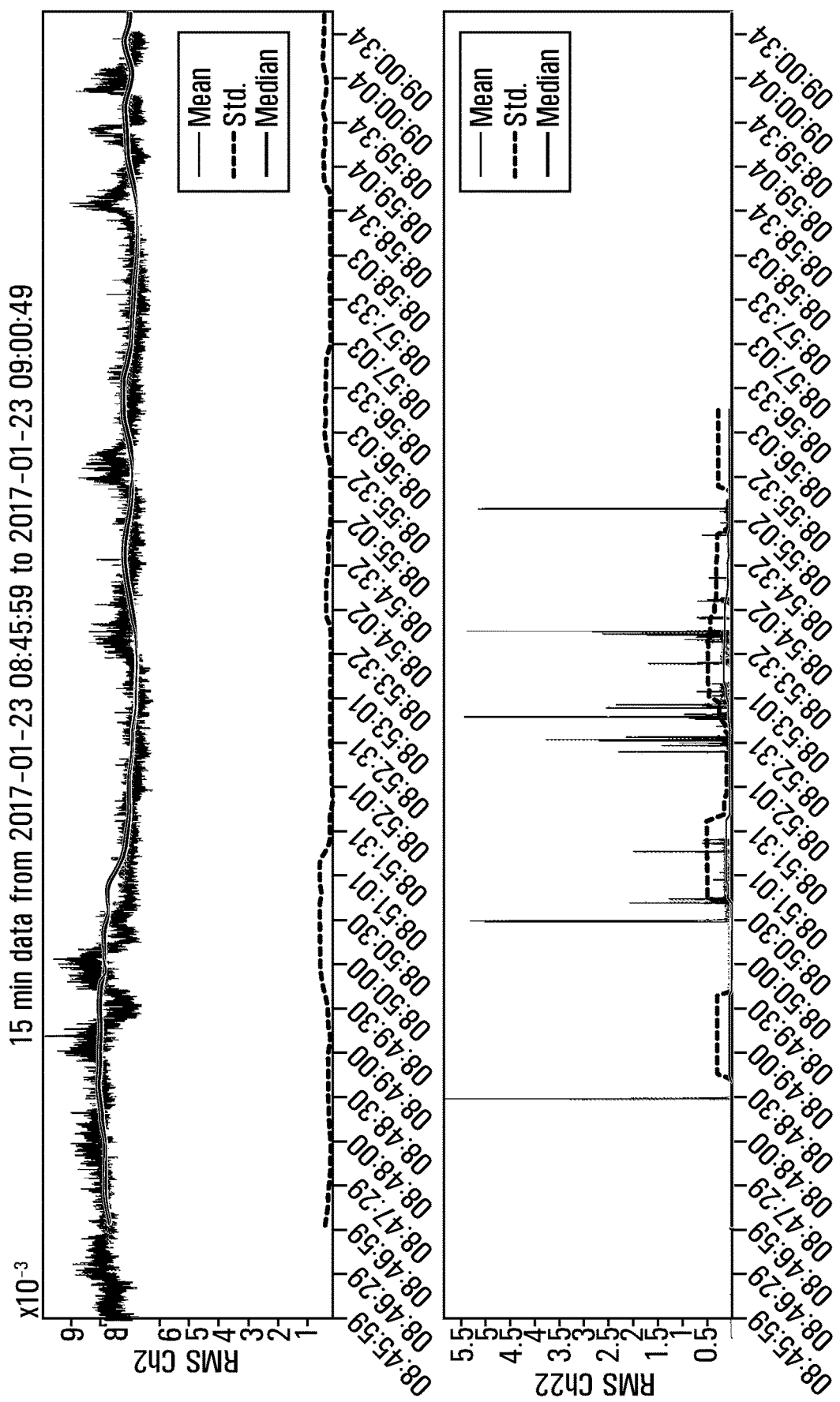
Figure 15:
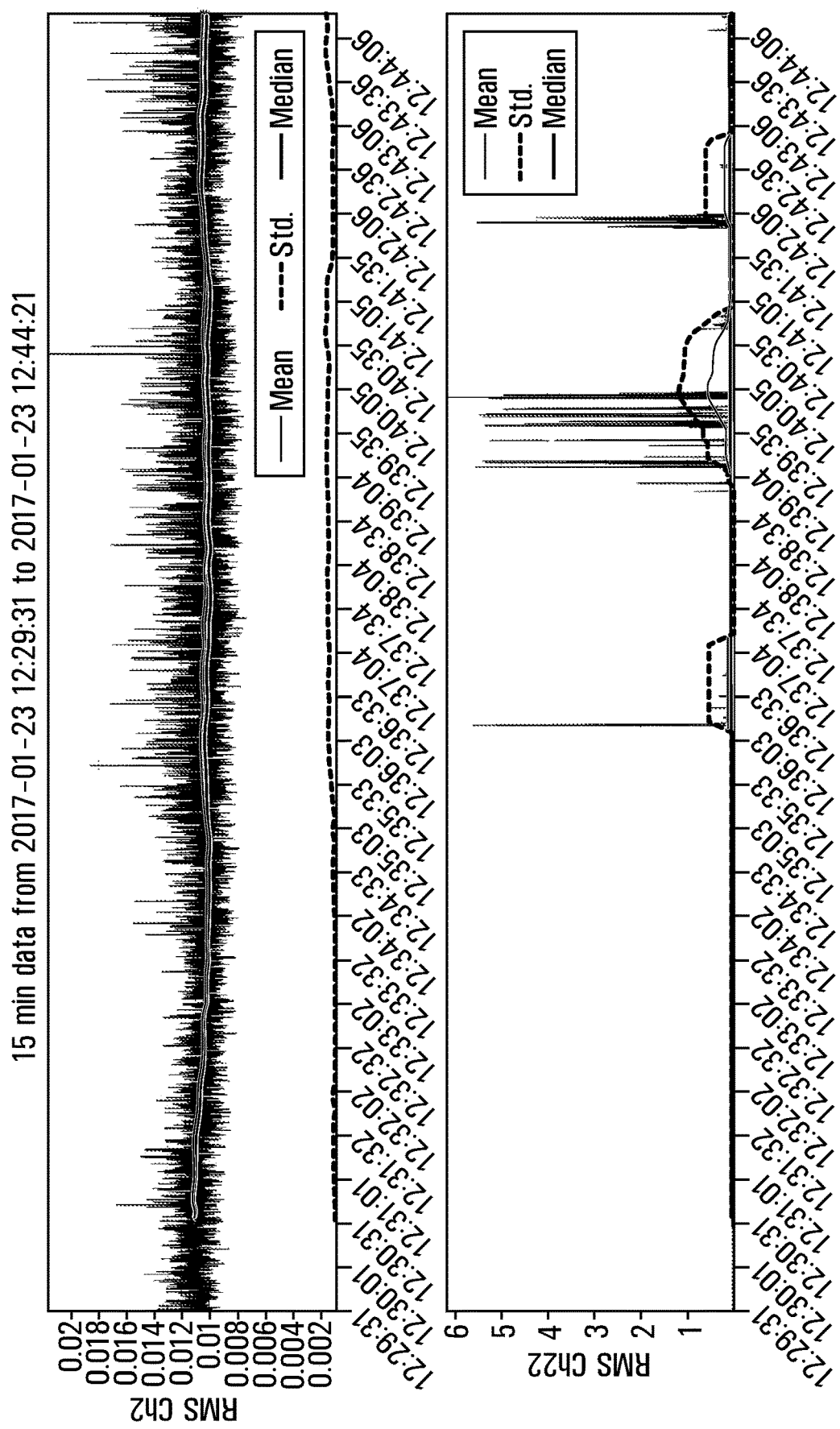
Figure 16:
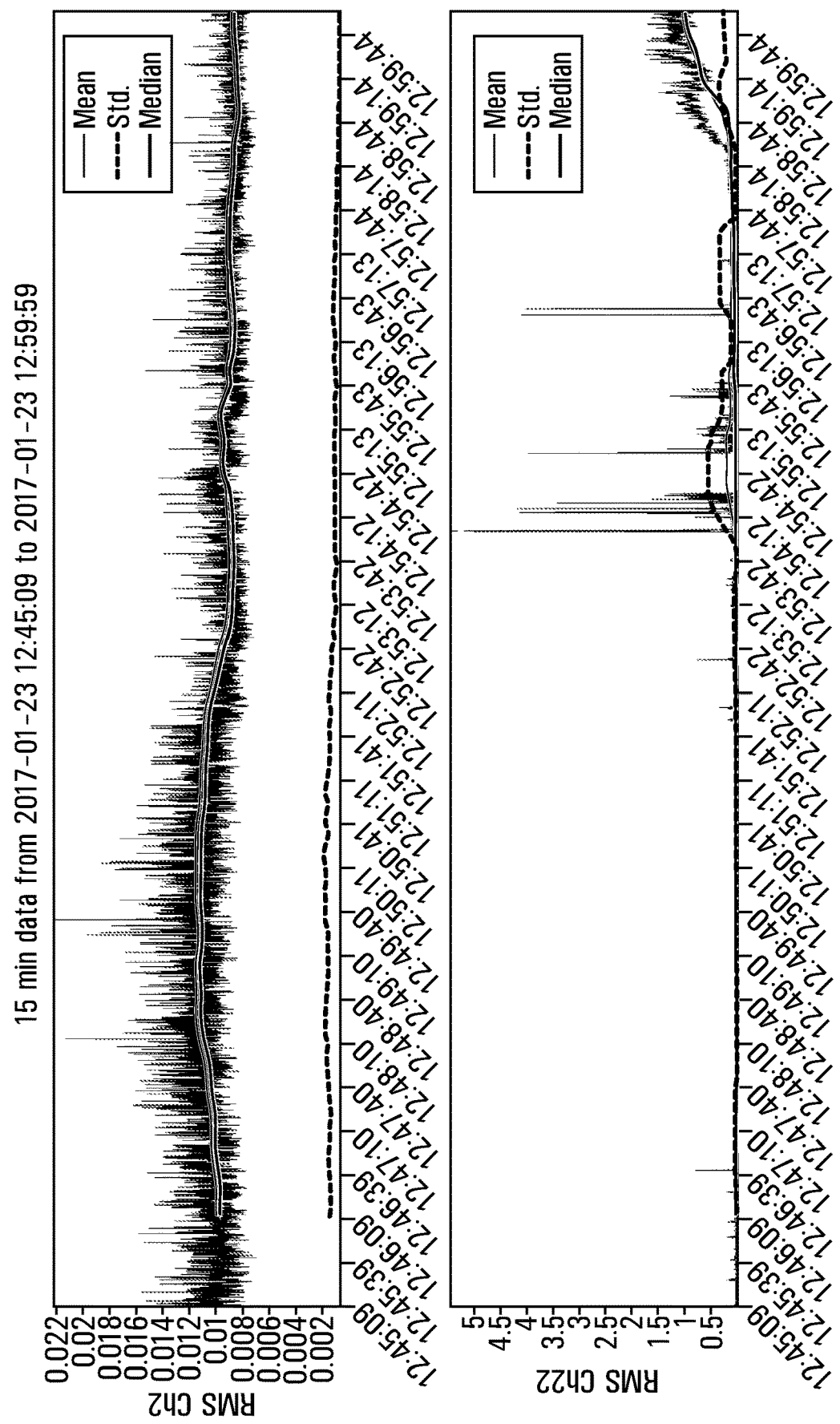

FIGS. 14-16 show plots of RMS and statistical parameter data (mean, median and standard deviation) for channels 2 and 17.

Figure 17:
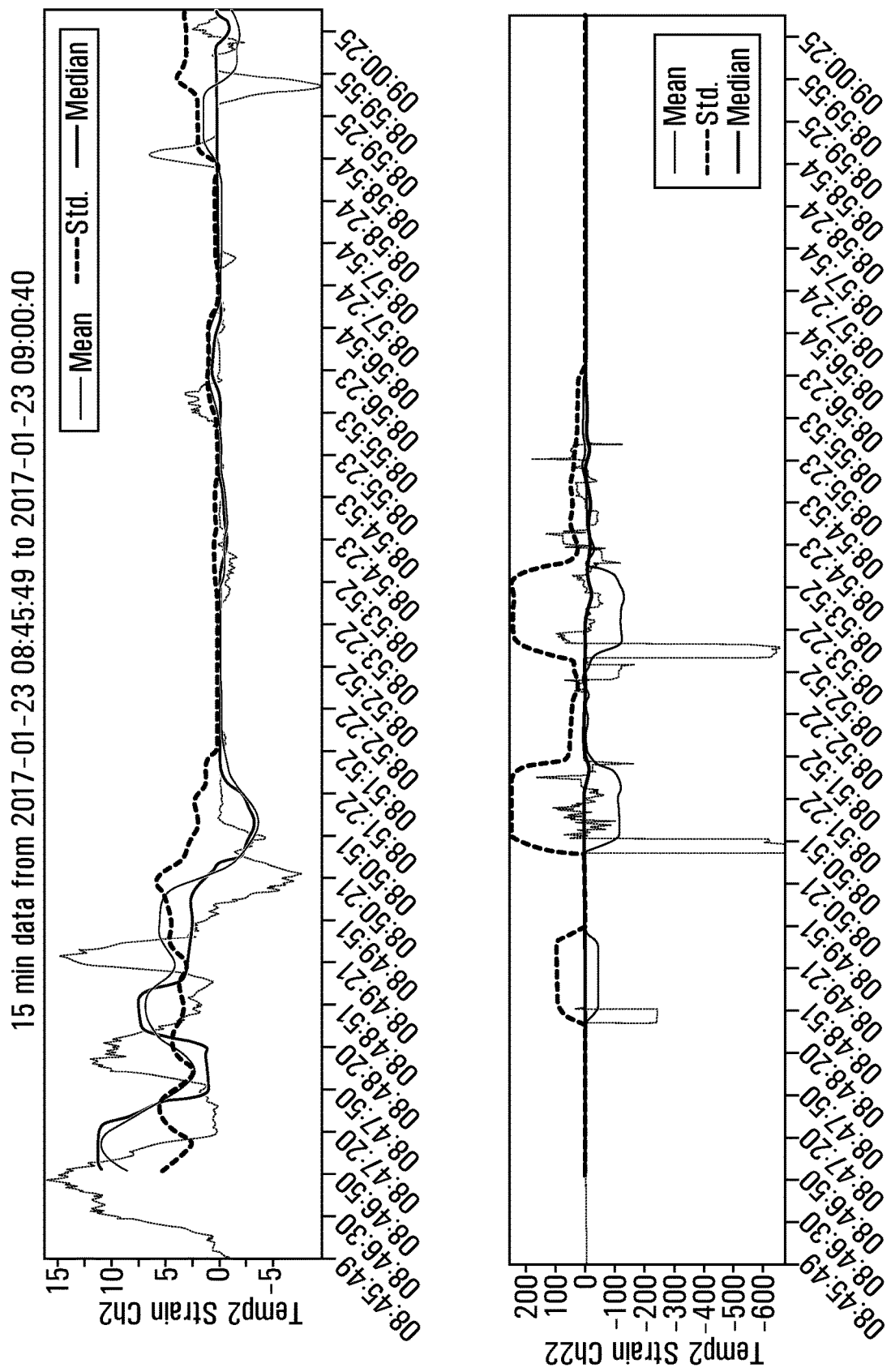
FIGS. 17-19 are plots showing statistical parameters of strain for two different channels of a pipeline.
Figure 18:
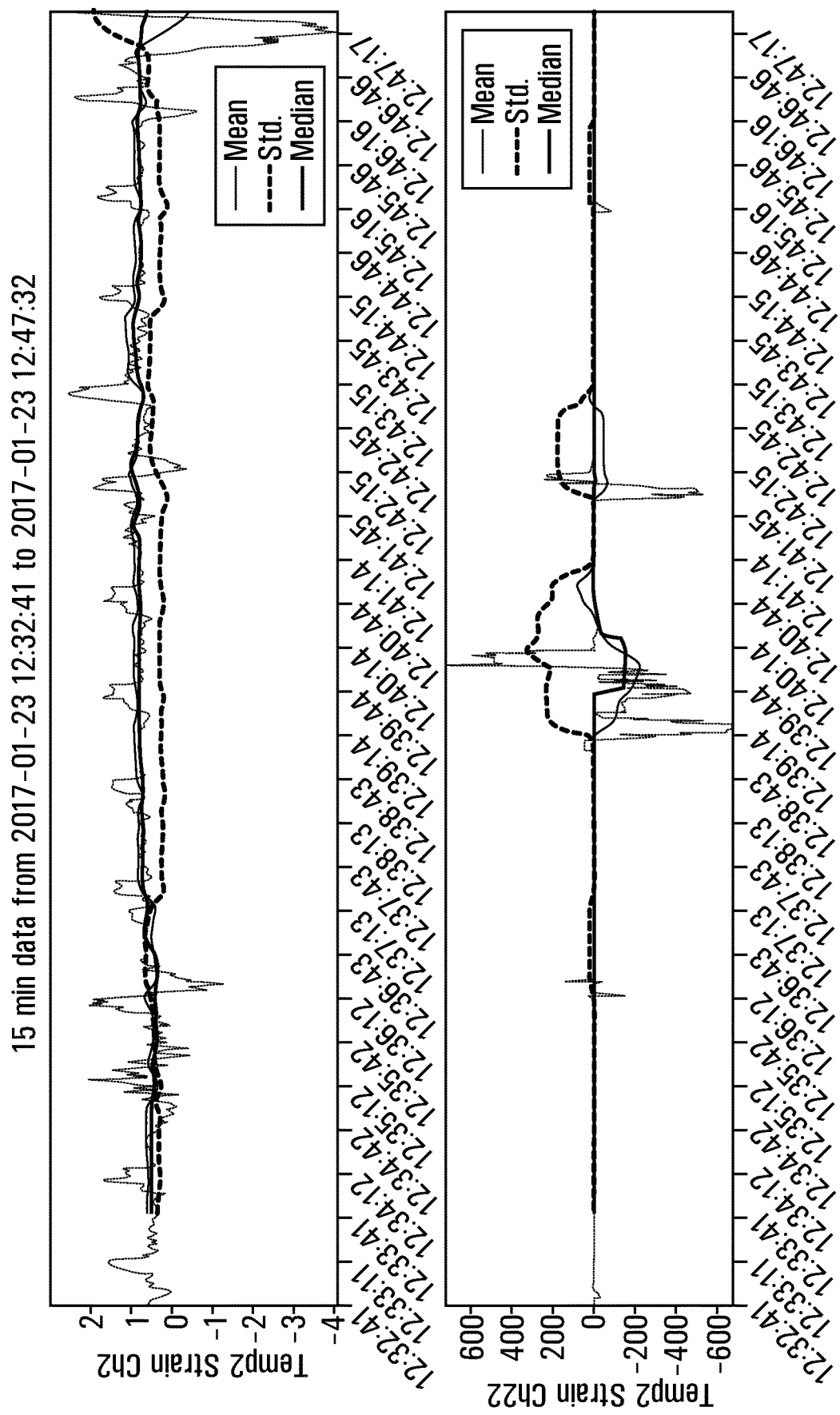
Figure 19:
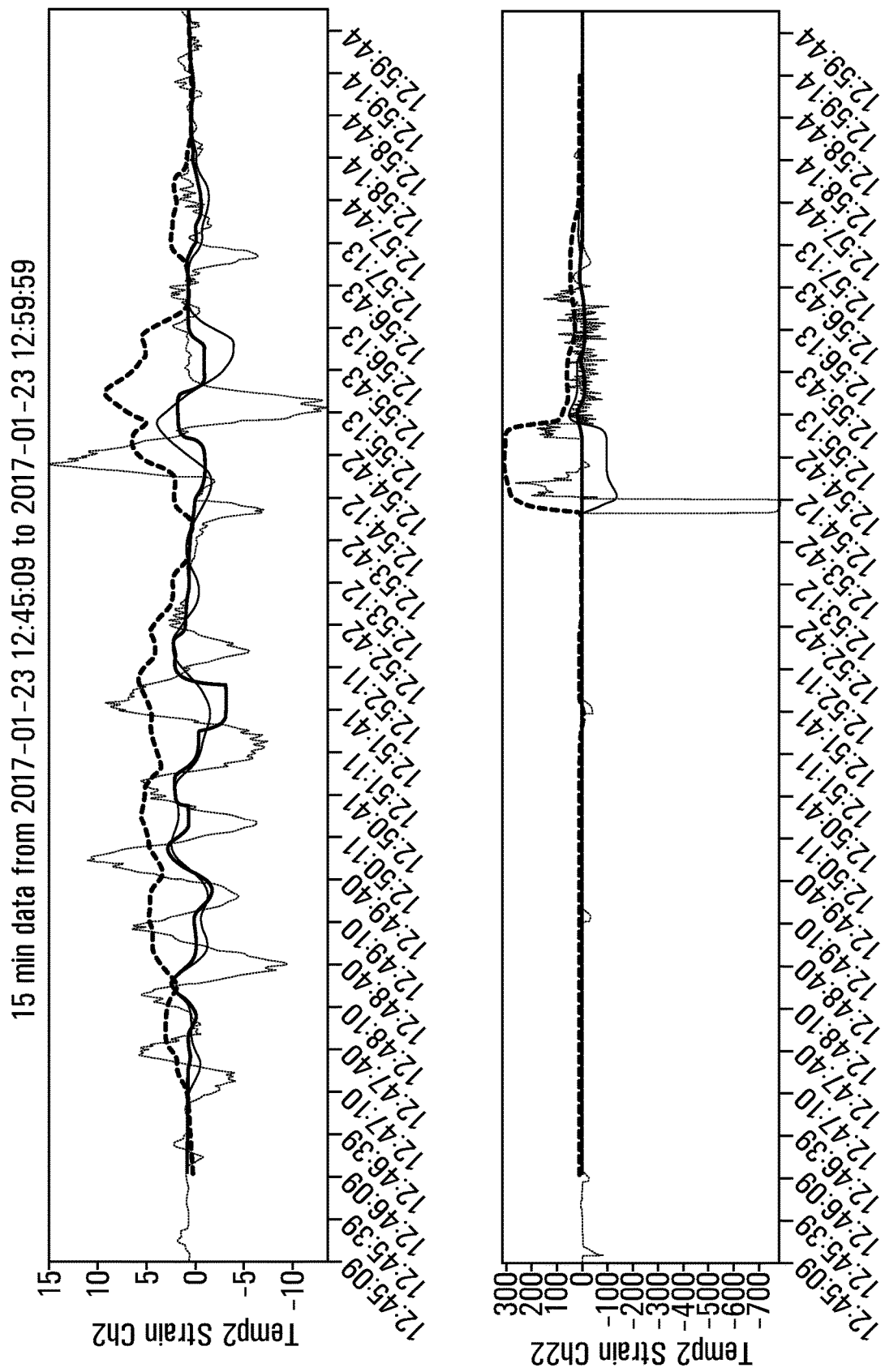

FIGS. 17-19 show plots of strain magnitude and associated statistical parameter data (mean, median and standard deviation) for channels 2 and 17.

Figure 20:
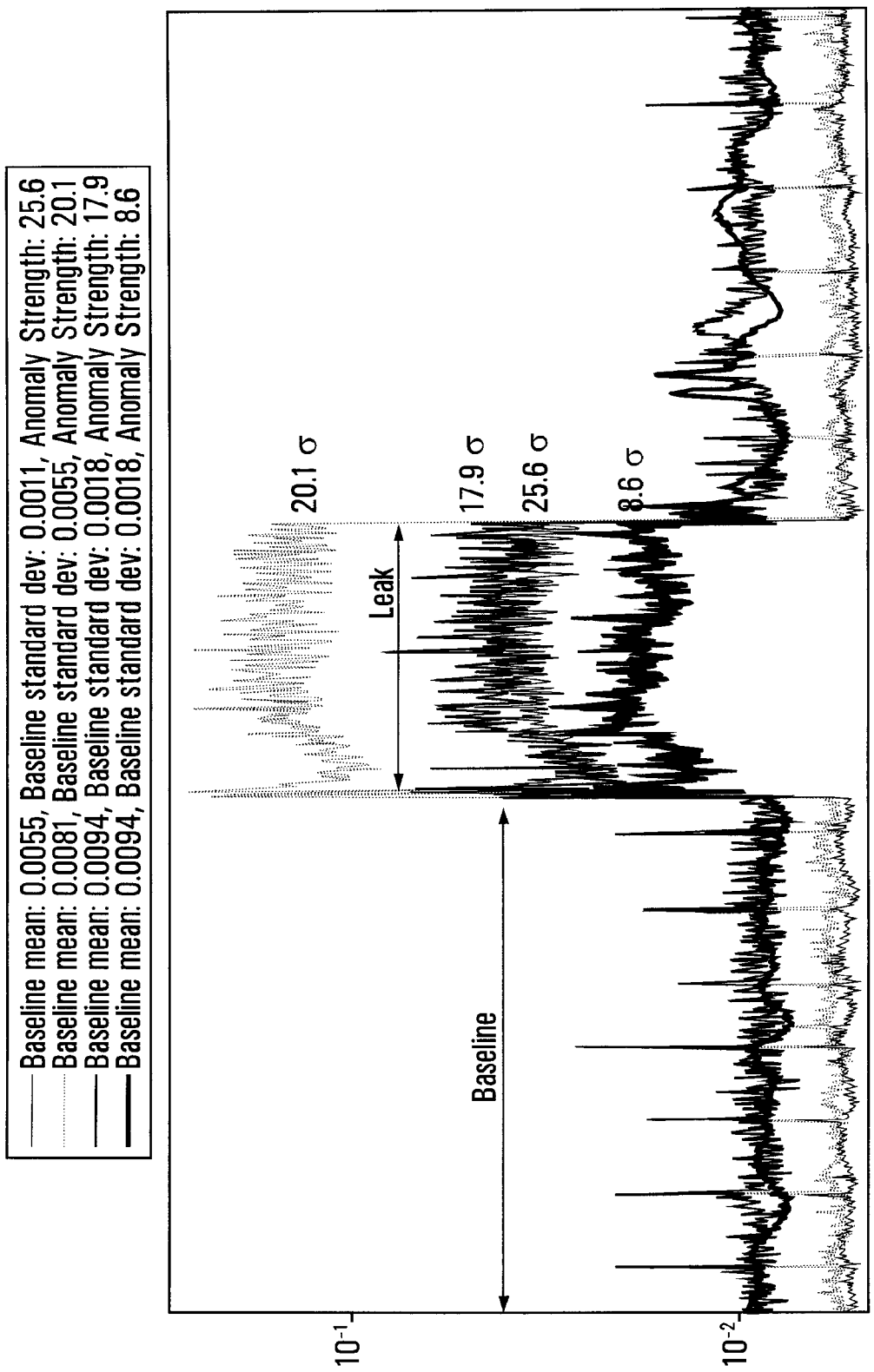
FIG. 20 is a plot of baselines for four different channels during a baselining period and a period during which a leak is detected.

FIG. 20 shows the calculated average baselines for four different channels. During a period when a simulated leak was detected, various channels monitoring the pipeline from different locations generated signals of different strength depending on their proximity to the leak. For example, the "green" channel shows an anomaly strength of 20.1 standard deviations (corresponding to a severity indicator of 20.1), whereas the grey channel shows an anomaly strength of 8.6 standard deviations (corresponding to a severity indicator of 8.6).

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of detecting events in a conduit, the method comprising:
   for each of multiple channels of the conduit, each channel comprising a portion of the conduit:
      obtaining sensor data for the channel, the sensor data being obtained from one or more sensors positioned to obtain sensor readings from the channel;
      determining, based on the sensor data and based on one or more conditions affecting the conduit during the obtaining of the sensor data, multiple baselines; and
      setting one or more event thresholds for identifying when an event has occurred at the channel; and
   for at least one channel of the multiple channels:
      selecting a baseline from among the multiple baselines determined for the at least one channel; and
      identifying whether an event has occurred at the at least one channel of the multiple channels, based on:
         the selected baseline; and
         the one or more event thresholds set for the at least one channel.

2. The method of claim 1, wherein obtaining the sensor data comprises using the one or more sensors to obtain the sensor readings.

3. The method of claim 1, wherein obtaining the sensor data comprises interrogating optical fiber positioned alongside the conduit.

4. The method of claim 3, wherein the sensor data comprises phase data obtained by measuring interference between light pulses transmitted along the optical fiber.

5. The method of claim 1, wherein the one or more sensors comprise one or more of pressure sensors, acoustic sensors, strain sensors, and temperature sensors.

6. The method of claim 1, wherein determining the multiple baselines comprises:
   extracting parameter data from the sensor data; and
   determining the multiple baselines from the extracted parameter data.

7. The method of claim 6, wherein the parameter data comprises data relating to one or more parameters from a group comprising: temperature, strain, acoustics, and vibration.

8. The method of claim 6, wherein determining the multiple baselines further comprises:
   processing the extracted parameter data to determine one or more statistical parameters of the parameter data; and
   determining the multiple baselines from the one or more statistical parameters.

9. The method of claim 8, wherein the one or more statistical parameters comprise one or more of: a mean of the parameter data; a median of the parameter data; a standard deviation of the parameter data; and a variance of the parameter data.

10. The method of claim 6, wherein the multiple baselines comprise a mean of the parameter data, and a standard deviation of the parameter data.

11. The method of claim 1, wherein identifying whether the event has occurred comprises:
  extracting parameter data from the measured sensor data; and
  determining whether a magnitude of at least one parameter of the extracted parameter data has exceeded at least one of the one or more event thresholds.

12. The method of claim 1, further comprising:
  processing the sensor data so as to identify undesired noise; and
  removing the undesired noise from the sensor data.

13. The method of claim 1, wherein the conduit comprises a pipeline or a well.

14. The method of claim 1, wherein the one or more conditions comprise:
  one or more seasons during which the sensor data is obtained; or
  whether a fluid is flowing within the conduit.

15. A system for detecting events in a conduit, comprising:
  an optical fiber interrogator for interrogating optical fiber; and
  one or more processors communicative with the optical fiber interrogator and memory having stored thereon computer program code configured, when executed by the one or more processors, to cause the one or more processors to perform a method comprising:
    for each of multiple channels of the conduit, each channel comprising a portion of the conduit:
      obtaining phase data for the channel, the phase data being obtained by causing the optical fiber interrogator to interrogate optical fiber positioned alongside the conduit;
      determining, based on the phase data and based on one or more conditions affecting the conduit during the obtaining of the sensor data, multiple baselines; and
      setting one or more event thresholds for identifying when an event has occurred at the channel; and
    for at least one channel of the multiple channels:
      selecting a baseline from among the multiple baselines determined for the at least one channel; and
      identifying whether an event has occurred at the at least one channel of the multiple channels, based on:
        the selected baseline; and
        the one or more event thresholds set for the at least one channel.

16. The system of claim 15, wherein the one or more conditions comprise:
  one or more seasons during which the phase data is obtained; or
  whether a fluid is flowing within the conduit.

17. A computer-readable medium having stored thereon computer program code executable by the one or more processors and configured, when executed by the one or more processors, to cause the one or more processors to perform a method comprising:
  for each of multiple channels of a conduit, each channel comprising a portion of the conduit:
    obtaining sensor data for the channel, the sensor data being obtained from one or more sensors positioned to obtain sensor readings from the channel;
    determining, based on the sensor data and based on one or more conditions affecting the conduit during the obtaining of the sensor data, multiple baselines; and
    setting one or more event thresholds for identifying when an event has occurred at the channel; and
  for at least one channel of the multiple channels:
    selecting a baseline from among the multiple baselines determined for the at least one channel; and
    identifying whether an event has occurred at at least one channel of the multiple channels, based on:
      the selected baseline; and
      the one or more event thresholds set for the at least one channel.

18. The computer-readable medium of claim 17, wherein the one or more conditions comprise:
  one or more seasons during which the sensor data is obtained; or
  whether a fluid is flowing within the conduit.

* * * * *